US010183397B2

(12) United States Patent
Takagi

(10) Patent No.: US 10,183,397 B2
(45) Date of Patent: Jan. 22, 2019

(54) ROBOT DEVICE, ROBOT CONTROL METHOD, PROGRAM, AND RECORDING MEDIUM

(71) Applicant: CANON KABUSHIKI KAISHA, Tokyo (JP)

(72) Inventor: Kiyoshi Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 15/098,230

(22) Filed: Apr. 13, 2016

(65) Prior Publication Data

US 2016/0229056 A1 Aug. 11, 2016

Related U.S. Application Data

(63) Continuation of application No. 14/251,499, filed on Apr. 11, 2014, now Pat. No. 9,339,929.

(30) Foreign Application Priority Data

Apr. 19, 2013 (JP) .................................. 2013-088442

(51) Int. Cl.
*B25J 9/16* (2006.01)
(52) U.S. Cl.
CPC .................. *B25J 9/1633* (2013.01)
(58) Field of Classification Search
CPC ...... B25J 9/1075; B25J 9/1633; B25J 9/1638; B25J 9/1641; B25J 9/1651; B25J 9/1635; B25J 9/1653
See application file for complete search history.

(56) References Cited

U.S. PATENT DOCUMENTS 9,339,929 B2 * 5/2016 Takagi .................... B25J 9/1633
9,427,870 B2 * 8/2016 Takagi .................... B25J 9/1633

FOREIGN PATENT DOCUMENTS

| JP | S61-249292 A | 11/1986 |
| JP | H06-121943 A | 5/1994 |
| JP | 2012-086354 A | 5/2012 |

OTHER PUBLICATIONS

Petit, et al., "Bidirectional Antagonistic Variable Stiffness Actuation: Analysis, Design & Implementation", 2010 IEEE International Conference on Robotics and Automation, Anchorage Convention District, May 3-8, 2010, Anchorage, Alaska, USA, pp. 4189-4196.*

(Continued)

*Primary Examiner* — Adam R Mott
(74) *Attorney, Agent, or Firm* — Canon USA, Inc. IP Division

(57) ABSTRACT

A joint torque computing unit computes a joint torque $T_1$ of a joint necessary to move a joint angle to a target joint angle. A summing unit obtains a sum value $U_1$ indicating the sum of generated forces generated at actuators, from a target stiffness. A setting unit sets a restricting coefficient $h_1$ to a value greater than 1 when performing non-antagonistic driving, and to 1 when performing antagonistic driving. A restricting unit takes $|T_1|<U_1 \times r \times h_1$ as restricting condition where r is moment arm radius, and restricts the joint torque $T_1$ to a range satisfying the conditions. A generated force computing unit computes the generated force of the actuators based on the restricted joint torque $T_1$. The setting unit sets the restricting coefficient $h_1$ to gradually near 1 when switching from non-antagonistic driving to antagonistic driving.

21 Claims, 21 Drawing Sheets

(56) References Cited

OTHER PUBLICATIONS

Oshima, et al., "Mechanical Properties of Robot Arm Operated with Muscle Coordinate System Consisted of Bi-Articular Muscles and Mano-articular Muscles", Journal of the Japan Society for Precision Engineering, (2000), pages 141-146, vol. 66, No. 1.*

* cited by examiner

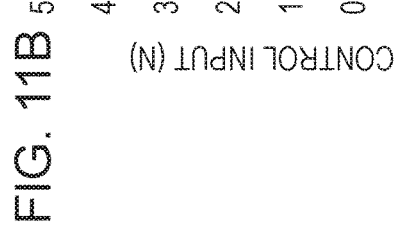
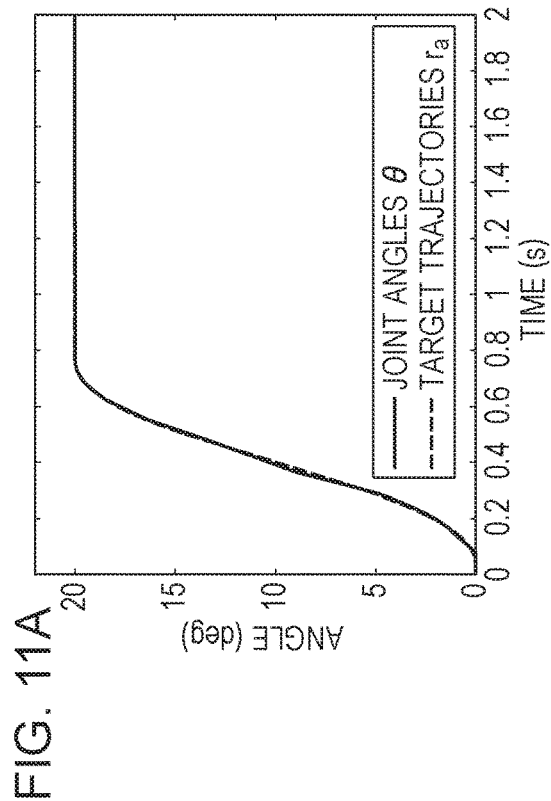
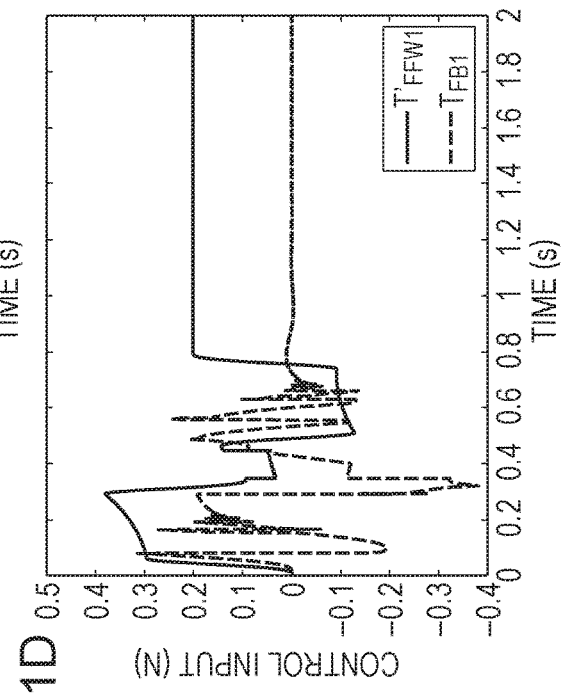
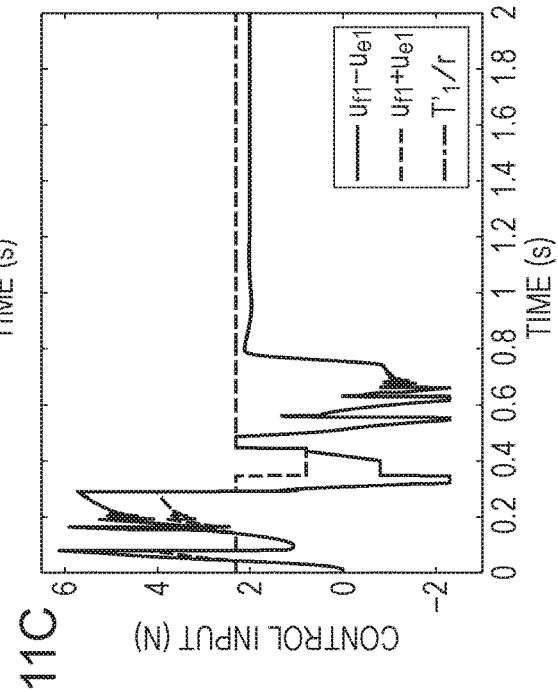

ROBOT DEVICE, ROBOT CONTROL METHOD, PROGRAM, AND RECORDING MEDIUM

CROSS-REFERENCE TO RELATED APPLICATIONS

This application is a continuation of U.S. patent application Ser. No. 14/251,499 filed Apr. 11, 2014, which claims the benefit of Japanese Patent Application No. 2013-088442, filed Apr. 19, 2013, all of which are hereby incorporated by reference herein in their entireties.

BACKGROUND OF THE INVENTION

Field of the Invention

The present invention relates to a robot device having a control unit to control a pair of actuators for rotational driving of a link, a robot control method, a program, and a recording medium.

Description of the Related Art

The ability for end effectors to flexibly come into contact with objects is becoming important in control methods of manipulators. Application of this to industrial robots could realize cooperative work between humans and robots, facilitating work of fitting parts to each other by controlling the direction of flexibility of end effectors, and so forth.

Also, applying this to legged locomotive robots could alleviate shock to the torso by coming into contact with the ground softly, and enable smooth ambulation over unsmooth terrain by absorbing difference in height.

In order to realize control of flexibility of the end effectors, impedance control where force sensors are worn on the end effectors, control using artificial muscle actuators, and so forth, is being performed. It is known that while human muscles are actuators, they are also control mechanisms with variable viscoelasticity. Rubber pneumatic artificial muscle actuators, of which the McKibben type artificial muscle actuator is representative, are similar to human muscles with regard to their viscoelastic properties. Now, controlling the softness of the artificial muscle actuators included in a manipulator enables contact with an object with optional end effector flexibility.

"Mechanical Properties of Robot Arm Operated with Muscle Coordinate System Consisted of Bi-articular Muscles and Mono-articular Muscles", Toru OSHIMA, Tomohiko FUJIKAWA, and Minayori KUMAMOTO, Journal of The Japan Society for Precision Engineering, Vol. 66, No. 1 pp. 141-146 (hereinafter "Oshima et al") proposes a "three-pair six-muscle model" manipulator having, in addition to artificial muscle actuators which drive a first link and a second link, a bi-articular simultaneous driving actuator to drive the first link and second link at the same time. Oshima et al have verified that by making the elasticity of the artificial muscle actuators to be equal, in a case where external force is applied to the end effectors along a line connecting a first joint and a end effector, there is exhibited a feature in stiffness characteristics in that the eternal force direction of the end effector and the direction of motion agree. McKibben actuators are difficult to use in motion control, due to the following reasons. The viscoelastic properties of McKibben actuators are nonlinear, and also control has to be applied to an antagonistic arrangement.

On the other hand, Japanese Patent Laid-Open No. 2012-86354 discloses deriving a simple feedback control system using saturation of control input, which controls joint angle at the same time as with stiffness control of the end effectors.

However, McKibben type artificial muscle actuators have to control pneumatic pressure by opening and closing valves, and it is known to be difficult to obtain high responsivity. Accordingly, research is being advanced on variable stiffness actuation (VSA) actuators, which use motors as force generating elements, and further combine mechanical elements such as springs and dampers, to enable variable viscoelasticity like that of an artificial muscle actuator to be realized. VSA also has a feature that the output direction of force is not restricted to the direction of contraction.

"Bidirectional Antagonistic Variable Stiffness Actuation: Analysis, Design & Implementation" Florian Petit, Maxime Chalon, Werner Friedl, Markus Grebenstein, Alin Albu-Schaffer and Gerd Hirzinger, 2010 IEEE International Conference on Robotics and Automation, pp. 4189-4196 (hereinafter "Petit et al") describes configuration a linear type VSA by linearly joining motors and non-linear springs, and situating linear type VSAs in an antagonistic manner as to a link. Both motors are used to control reserve tensile force of the non-linear springs, thereby changing the angle and joint stiffness of the manipulator. Petit et al describes providing non-linear springs with initial deformation, and perpetually performing control for antagonistic driving, which is referred to as "normal mode". In a case where a greater joint driving torque becomes necessary, such as external force being applied to the end effector or the like, the reserve tensile force is reduced. This releases the antagonistic driving state, so both VSAs apply torque in the same direction to the joint, which is referred to as "helping mode".

Petit et al describes antagonistic placement of linear type VSAs to perform antagonistic driving when accurate joint stiffness is necessary, and to perform non-antagonistic driving when greater torque is necessary. On the other hand, the artificial muscle actuators described in Oshima et al and Japanese Patent Laid-Open No. 2012-86354 are modeled with the force generating element, spring, and damper arrayed in parallel. Hereinafter, this arrangement will be referred to as "parallel type VSA".

Using such a parallel type VSA enables generated force of the force generating element to be applied to the manipulator without passing through the spring and damper, and thus is advantageous in that highly-precise positioning control can be had. However, there has not been proposed as of yet a control system which transitions seamlessly between antagonistic driving and non-antagonistic driving, using a parallel type VSA.

SUMMARY OF THE INVENTION

Accordingly, the present invention uses parallel type VSAs for actuators to perform simultaneous control of end effector stiffness properties and joint angle under antagonistic driving, and seamlessly transitions from antagonistic driving to non-antagonistic driving when output of the actuators is insufficient or when reducing the output.

A robot device is provided. A manipulator includes a first link rotatably linked to a base by a first joint, and a pair of first actuators, modeled as a parallel connection of a force generating element, elastic element, and viscous element, selectively generating one generated force of tensile force and pushing force, and situated on either side of the first link so as to rotationally drive the first link on the first joint. The manipulator also includes a control unit which performs non-antagonistic driving where driving control of the first link is performed by causing one of the pair of first actuators to generate tensile force and the other to generate pushing force such that a first joint angle of the first joint reaches a first target joint angle, and antagonistic driving where driving control of the first link is performed by causing both of the pair of first actuators to generate tensile force, such that stiffness of the first joint reaches a first target stiffness when the first joint angle has converged at the first target joint angle. The control unit executes first joint torque computing processing to compute a first torque for the first joint, necessary to change the first joint angle to the first target joint angle. The control unit also executes first summing processing to obtain a first sum value, indicating a sum of generated force to be generated at each first actuator, from the first target stiffness. The control unit also executes first setting processing to set a first restricting coefficient to a value greater than 1 when performing the non-antagonistic driving, and to set the first restricting coefficient to 1 when performing the antagonistic driving. The control unit further executes first restricting processing in which $|T_1| < U_1 \times r \times h_1$ is a first restricting condition, where the first joint torque is represented by $T_1$, the first sum value is represented by $U_1$, moment arm radius of the first link is represented by r, and the first restricting coefficient is represented by $h_1$, so as to restrict the first joint torque to a range satisfying the first restricting condition. The control unit also moreover executes first generated force computing processing to compute generated force at each first actuator, based on the first joint torque restricted in the first restricting processing. In the first setting processing, setting is performed at the time of the non-antagonistic driving when switching from the non-antagonistic driving to the antagonistic driving, such that the first restricting coefficient gradually nears 1.

According to the above configuration, highly precise motion control and control of link flexibility as to a manipulator using parallel type VSAs as actuators can be realized, by enabling transitioning between antagonistic driving and non-antagonistic driving.

Further features of the present invention will become apparent from the following description of exemplary embodiments with reference to the attached drawings.

BRIEF DESCRIPTION OF THE DRAWINGS

FIGS. 11A through 11D are diagrams illustrating simulation results according to the second embodiment.

DESCRIPTION OF THE EMBODIMENTS

Embodiments for carrying out the present invention will be described in detail with reference to the drawings.

First Embodiment

1. Modeling

Figure 1:
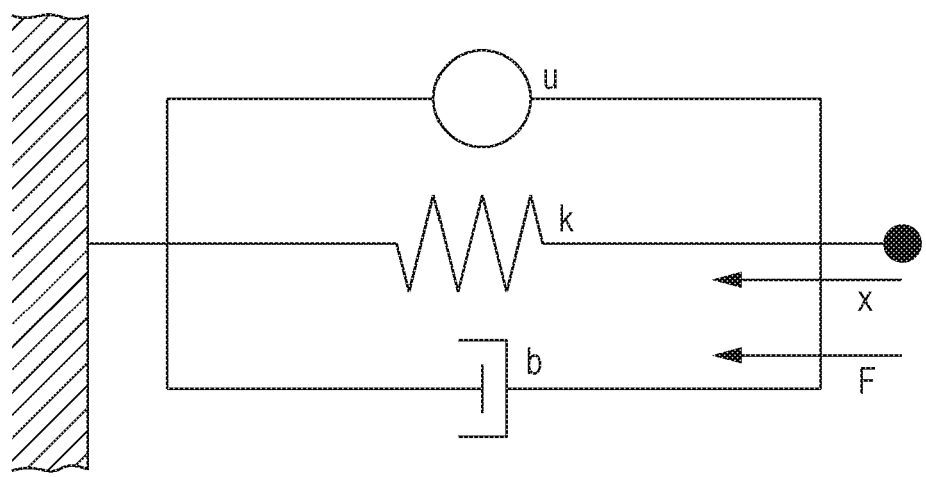
FIG. 1 is a schematic diagram illustrating a viscoelasticity model of an actuator.

FIG. 1 is a schematic diagram illustrating a viscoelasticity model of an actuator. In the first embodiment, a parallel type VSA is used as an actuator. A muscle, i.e., parallel type VSA, is modeled using a force generating element, an elastic element, and a viscous element, connected in parallel, as illustrated in FIG. 1.

In FIG. 1, u represents generated force of the force generating element, and x represents the amount of contraction of muscle where the direction of contraction is the positive direction. The speed of contraction is expressed as follows.
$\dot{x}$ Also, the viscoelasticity of the muscle is modeled as $$F = u - kux - bu\dot{x} \quad (1)$$

where k represents the elastic constant, b represents the viscosity constant, and F represents the force generated at the muscle. This model is characterized in that the elasticity and viscosity of the force generated at the muscle have a non-linear element proportional to the generated force u of the force generating element.

In the first embodiment, a parallel type VSA combining mechanisms of motors and springs is used as an actuator, thereby realizing viscoelasticity of muscles. For example, an actuator such as an electromagnetic motor can be used for the force generating element. Variable stiffness can be realized by using a spring and a mechanism for varying the length of the spring, and another actuator for driving this, as the elastic element. Variable viscoelasticity can be realized by using a semi-active damper using a variable orifice, as the viscous element.

Figure 2:
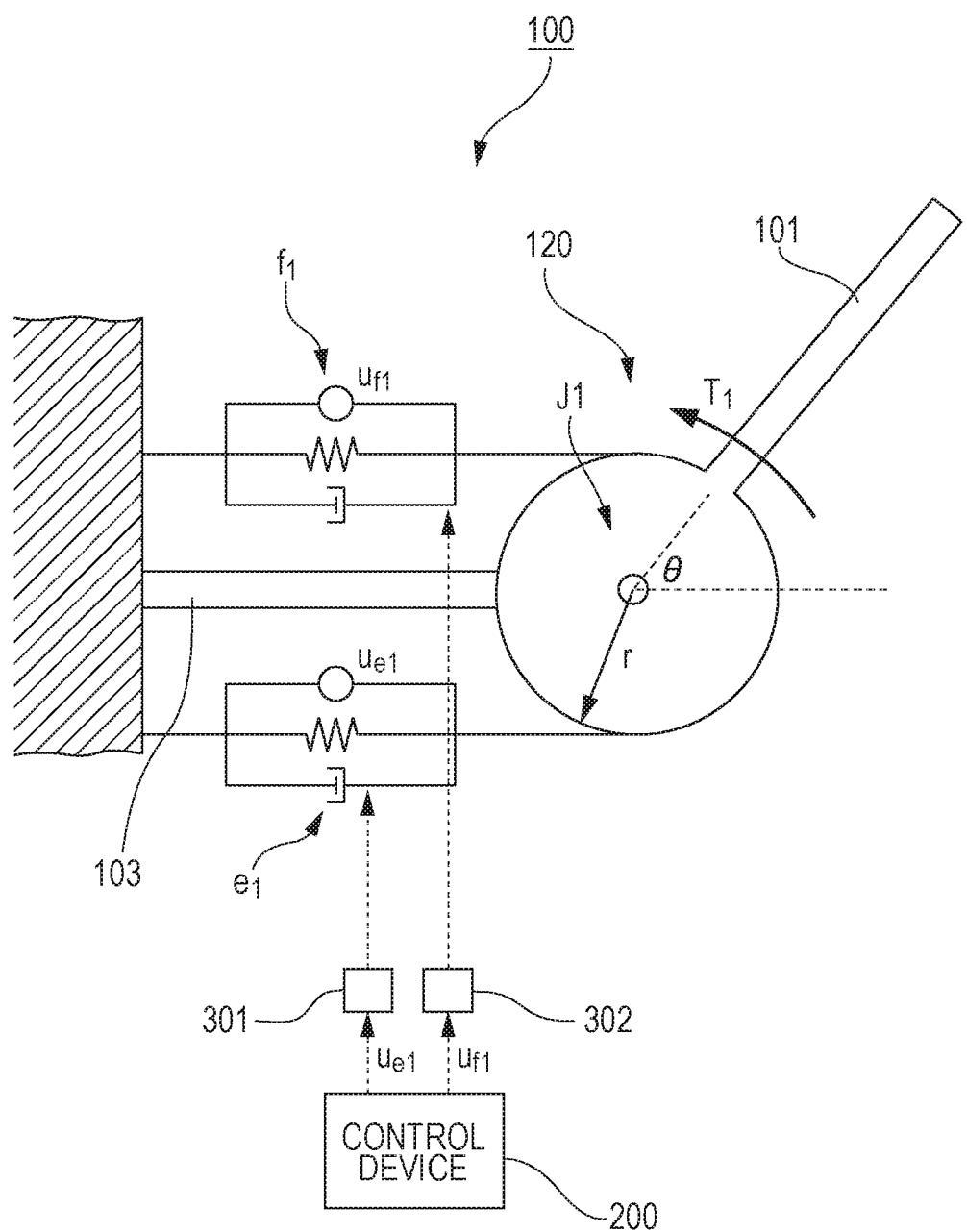
FIG. 2 is a schematic diagram illustrating a robot device according to a first embodiment.

FIG. 2 illustrates a robot device according to the first embodiment. The robot device 100 illustrated in FIG. 2 has a so-called one-link manipulator (hereinafter simply "manipulator") 120. The manipulator 120 has a link 101 which is a first link, and actuators $e_1$ and $f_1$ which are a pair of bi-articular driving actuators.

A base end of the link 101 is rotatably linked to a base 103 by a joint J1 which is a first joint.

The actuators $e_1$ and $f_1$ are parallel type VSAs modeled as a parallel connection of the force generating element, elastic element, and viscous element. The actuators $e_1$ and $f_1$ selectively generate generating force of either pulling force or pushing force. The actuators $e_1$ and $f_1$ are disposed on either side of the link 101, so as to rotationally drive the link 101 on the joint J1. One end of the actuators $e_1$ and $f_1$ is fixed to the base 103 and the other end to the link 101.

The rotational angle of the link 101 which is the joint angle (first joint angle) of joint J1 is expressed as θ. The actuator $f_1$ disposed so as to increase the joint angle θ by contractile force (tensile force) of the force generating element of the actuator will be referred to as "folding side actuator", and the actuator $e_1$ on the opposite side will be referred to as "unfolding side actuator". The generated force of the force generating elements of the unfolding side and folding side actuators $e_1$ and $f_1$ are expressed as $u_{e1}$ and $u_{f1}$, respectively, inertia moment of the link 101 is expressed as I, and moment arm radius as r. These give the following motion equation.

$$I\ddot{\theta}=(u_{f1}-u_{e1})r-(u_{f1}+u_{e1})kr^2\theta-(u_{f1}+u_{e1})br^2\dot{\theta} \quad (2)$$

We can see that the difference in generated force $u_{e1}$ and $u_{f1}$ at the first term to the right side of Expression (2) gives the joint J1 rotational torque (joint torque), and the sum of generated forces $u_{e1}$ and $u_{f1}$ in the second and third terms to the right side change the stiffness and viscosity regarding the joint J1.

2. Control System Design

The robot device 100 includes a control device 200, and two drivers 301 and 302 which respectively drive the actuators $e_1$ and $f_1$, based on the generated force command values $u_{e1}$ and $u_{f1}$ from the control device 200.

The control device 200 generates the generated force command values $u_{e1}$ and $u_{f1}$ corresponding to the respective actuators $e_1$ and $f_1$. The control device 200 then outputs the generated force command values $u_{e1}$ and $u_{f1}$ to the drivers 301 and 302, thereby controlling the generated force of the actuators $e_1$ and $f_1$.

Figure 3:
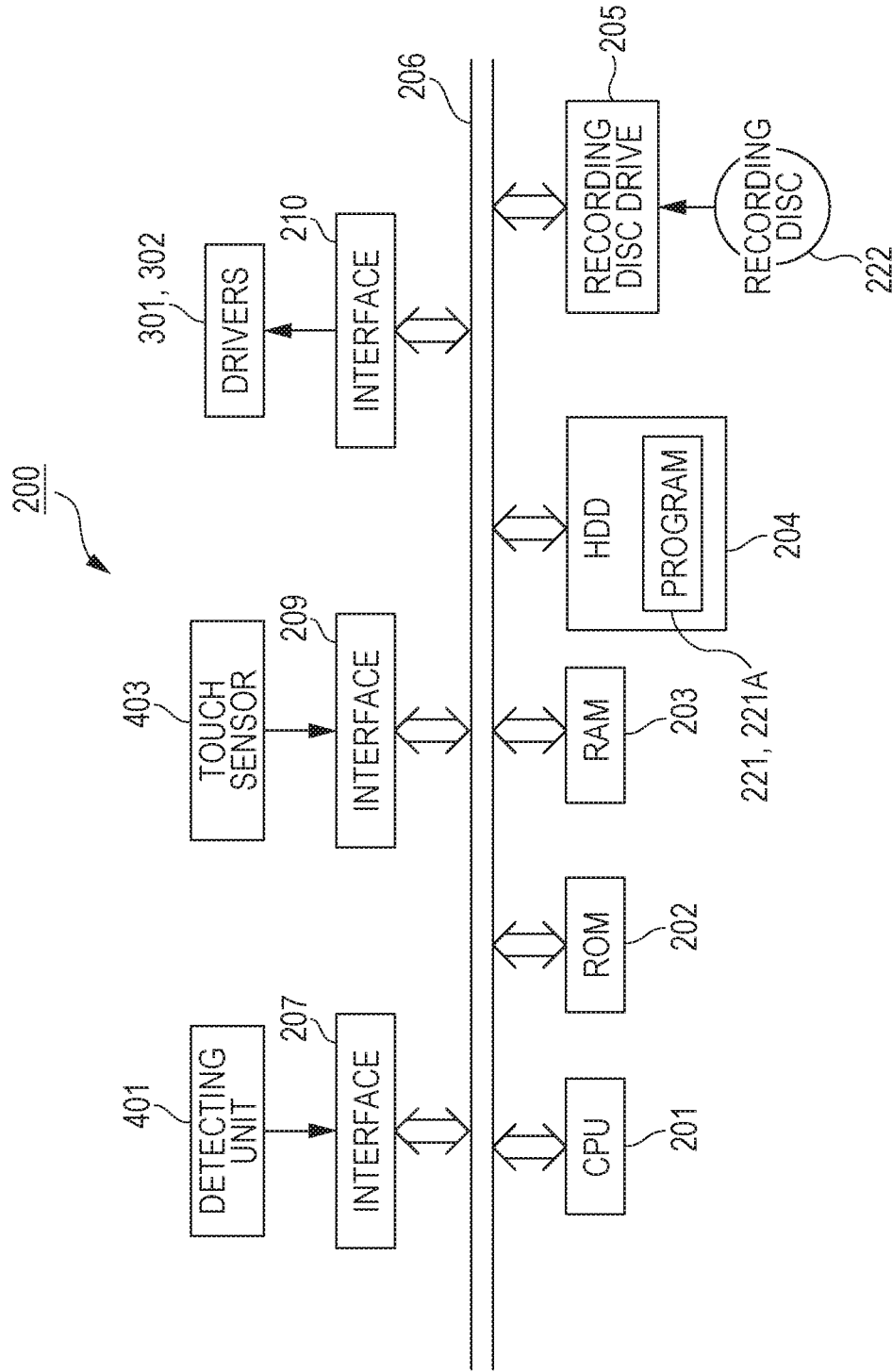
FIG. 3 is a block diagram illustrating a configuration of a control device according to the first embodiment.

Before describing the operations of the control device 200, the device configuration of the control device 200 will be described. FIG. 3 is a block diagram illustrating the configuration of the control device 200.

The control device 200 is configured as a computer, including a central processing unit (CPU) 201 serving as a control unit (computing unit). The control device 200 also includes read only memory (ROM) 202, random access memory (RAM) 203, a hard disk drive (HDD) 204, a recording disk drive 205, and various interfaces 207, 209, and 210.

The CPU 201 has connected thereto the ROM 202, RAM 203, HDD 204, recording disk drive 205, and various interfaces 207, 209, and 210, via a bus 206. The ROM 202 stores basic programs such as a basic input/output system (BIOS) and so forth. The RAM 203 is a storage device which temporarily stores the results of computation processing performed at the CPU 201.

The HDD 204 serves as a storage unit to store various types of data, such as results of computation processing performed at the CPU 201, and as a recording medium recording programs 221 whereby the CPU 201 executes various types of computation processing described later. The CPU 201 executes various types of computation processing based on the programs 221 recorded in the HDD 204.

The recording disk drive 205 reads out various types of data and programs recorded in a recording disc 222.

The aforementioned drivers 301 and 302 are connected to the interface 210. The CPU 201 outputs the generated force command values $u_{e1}$ and $u_{f1}$ to the drivers 301 and 302 via the bus 206 and interface 210. The drivers 301 and 302 generate generated force at the actuators $e_1$ and $f_1$, corresponding to the generated force command values $u_{e1}$ and $u_{f1}$.

In the first embodiment, the robot device 100 includes a detecting unit 401 which is a first detecting unit omitted from illustration in FIG. 1, and a touch sensor 403. The detecting unit 401 is disposed at the joint J1 in FIG. 1, and detects the joint angle θ of the joint J1. The touch sensor 403 is disposed on the link 101, and detects whether or not an object has come into contact with the link 101.

The detecting unit 401 is connected to the interface 207, so that a signal indicating the detected joint angle θ is transmitted to the CPU 201 via the interface 207 and bus 206. The touch sensor 403 is connected to the interface 209, so that a signal indicating whether or not there has been contact is transmitted to the CPU 201 via the interface 209 and bus 206.

Figure 4:
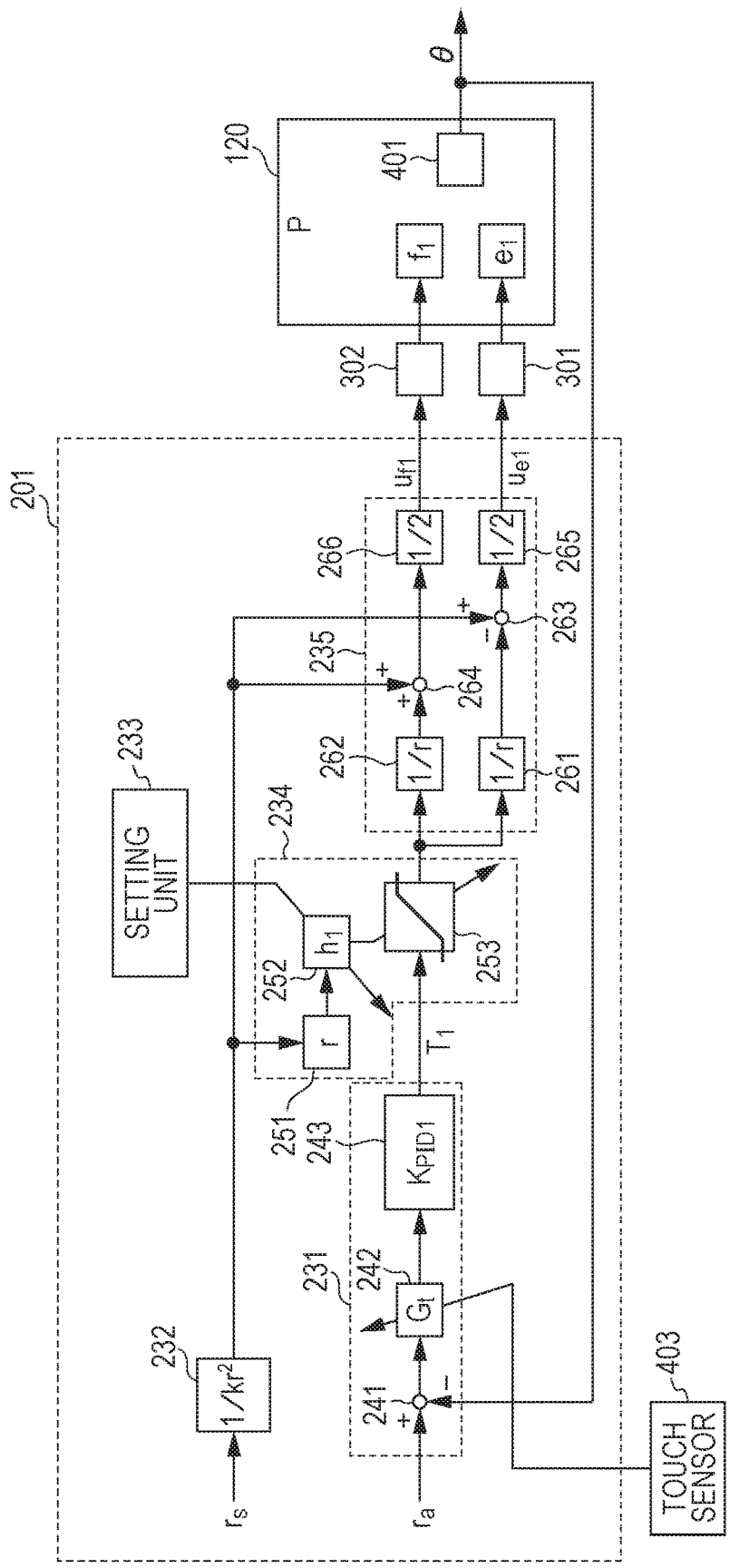
FIG. 4 is a functional block line diagram for describing control operations of a CPU according to the first embodiment.

FIG. 4 is a functional block line diagram for describing control operations of the CPU 201. A robot control method will be described with reference to FIG. 4. Note that in FIG. 4, the manipulator 120 is denoted by reference symbol P. The CPU (control unit) 201 of the control device 200 functions as each part illustrated in FIG. 4 by reading out the program 221 from the HDD 204 and executing the program 221.

The CPU 201 functions as a joint torque computing unit 231 which executes first joint torque computation processing, a summing unit 232 which executes first summing processing, a setting unit 233 which executes first setting processing, and a restricting unit 234 which executes first restricting processing. The CPU 201 further functions as a generated force computing unit 235 which executes first generated force computing processing, based on the program 221.

In the first embodiment, the CPU 201 functions as the units 231 through 235, thereby positioning the joint angle (first joint angle) of the joint J1 to the target joint angle (first target joint angle) $r_a$, and at the same time controls the stiffness of the joint J1 to the target stiffness (first target stiffness) $r_a$. That is to say, the CPU 201 generates tensile force at one of the pair of actuators $e_1$ and $f_1$, and pushing force at the other, thus performing non-antagonistic driving to control driving of the link 101. Further, when the joint angle θ has converged on the target joint angle $r_a$, the CPU 201 performs antagonistic driving to control driving of the link 101 by generating tensile force at both of the actuators $e_1$ and $f_1$, so that the stiffness of the joint J1 is the target stiffness $r_s$.

Specifically, the joint torque computing unit 231 computes joint torque for the joint J1 (first joint torque) $T_1$ necessary for setting the joint angle θ to the target joint angle $r_a$ (first joint torque computing step). In this first embodiment, the joint torque computing unit 231 is a feedback computing unit which executes feedback computing processing as the first joint torque computing processing. In feedback computing processing, the joint torque $T_1$ is obtained by feedback computation based on the difference between the joint angle θ and the target joint angle $r_a$.

In further detail, the joint torque computing unit (feedback computing unit) 231 includes a difference computing unit 241, a gain adjusting unit 242, and a Proportional Integral Derivative (PID) control unit 243.

The difference computing unit 241 computes the difference between the joint angle θ and the target joint angle $r_a$ (θ−$r_a$). The gain adjusting unit 242 sets the gain to 0 in a case where contact is detected by the contact sensor 403, and sets the gain to 1 if not detected. The PID control unit 243 computes feedback control torque (i.e., joint torque) $T_{FB1}$ ($T_1$) to compensate the difference (θ−$r_a$), based on a transfer function $K_{PID1}$.

In this section, a control method will be described where first, conditions for performing antagonistic driving are derived, and next, transition is made between antagonistic driving and non-antagonistic driving.

Determining generated force command values $u_{e1}$ and $u_{f1}$ so as to satisfy $$(u_{f1} - u_{e1})r = T_1 \quad (3)$$

based on Expression (2) enables the feedback control torque $T_1$ to be applied to the joint J1.

However, the conditions relating to stiffness of the joint J1

$$(u_{f1} + u_{e1})kr^2 = r_a \quad (4)$$

need to be satisfied at the same time.

The generated force command values $u_{e1}$ and $u_{f1}$ need to be defined so as to satisfy $$U_1 = r_s/kr^2 \quad (6)$$

when $U_1$ is defined as the sum value of the generated force command values $u_{e1}$ and $u_{f1}$ as follows.

$$u_{f1} + u_{e1} = U_1 \quad (5)$$

In order to satisfy the feedback control torque $T_1$ and the sum value $U_1$ of generated force command values at the same time, it is sufficient for Expressions (3) and (5) to be solved regarding $u_{e1}$ and $u_{f1}$, to determine the following.

$$u_{f1} = \frac{U_1 + T_1/r}{2}, \quad u_{e1} = \frac{U_1 - T_1/r}{2} \quad (7)$$

In order to perform antagonistic driving in which the actuators $e_1$ and $f_1$ generate tensile force only in the tensile direction (contractile force), it is sufficient that the conditions $$u_{f1} > 0, u_{e1} > 0 \quad (8)$$

be satisfied at the same time.

Expressions (7) and (8) yield the following conditions.

$$T_1/r < U_1, T_1/r > -U_1 \quad (9)$$

That is to say, the manipulator 120 is positioned at the target angle $r_a$ by the feedback control torque $T_1$ at the same time as the stiffness of the joint J1 attaining the target stiffness $r_s$ if the feedback control torque $T_1$ satisfies the following conditions.

$$-U_1 r < T_1 < U_1 r \quad (10)$$

Expression (10) can be realized by restricting the feedback control torque $T_1$ to $$|T_1| < U_1 r \quad (11)$$

as illustrated in the block line diagram in FIG. 4.
Alternatively, there is a method where the gain of the joint torque computing unit 231, which performs feedback control, is changed, so that the magnitude of control input fits within the range in Expression (10).

Next, it is sufficient for Expression (10) to not hold, in order to perform non-antagonistic driving so as to generate pushing force at the actuators $e_1$ and $f_1$. The reason is that Expression (10) not holding means that the conditions of Expression (8), whereby only force in the tensile direction is generated at the actuators $e_1$ and $f_1$, are not satisfied. Accordingly, in the first embodiment, a restricting coefficient $h_1$ which is a first restricting coefficient is introduced as a parameter for adjusting the degree of antagonism, and Expression (10) is rewritten as follows.

$$|t_1| < U_1 r h_1 \quad (12)$$

Now, when $h_1$=1, Expression (12) and (10) are equal, so antagonistic driving is achieved. On the other hand, setting $h_1 \gg 1$ achieves non-antagonistic driving.

That is to say, in the first embodiment, first, the summing unit 232 obtains the sum value $U_1$ of indicating the sum of generated force generated at the actuators $e_1$ and $f_1$, based on the relational expression in Expression (6) from the target stiffness $r_s$ (first summing step).

In a case of non-antagonistic driving, the setting unit 233 sets the restricting coefficient $h_1$ to a value greater than 1, and in a case of antagonistic driving sets the restricting coefficient $h_1$ to 1 (first setting step).

The restricting unit 234 includes a multiplying unit 251 which multiples the sum value $U_1$ by the moment arm radius r of the link 101, a multiplying unit 252 which further multiples by the restricting coefficient $h_1$, and a restricting processing unit 253 which restricts the feedback control torque $T_1$ to the computed results of the multiplying unit 252, which are $U_1 \times r \times h_1$. Accordingly, the restricting unit 234 has as the first restricting condition $|T_1| < U_1 \times r \times h_1$, and restricts the feedback control torque $T_1$ to a range so as to satisfy the first restricting condition (first restricting step).

The generated force computing unit 235 computes the generated force command values $u_{e1}$ and $u_{f1}$ of the actuators $e_1$ and $f_1$ based on the feedback control torque $T_1$ restricted by the restricting unit 234 (first generated force computing step). In detail, the generated force computing unit 235 computes $(U_1 - T_1/r)/2$ as the generated force command value $u_{e1}$, and computes $(U_1 + T_1/r)/2$ as the generated force command value $u_{f1}$.

In further detail, the generated force computing unit 235 includes a multiplying unit 261 which multiples $T_1$ by 1/r, a subtracting unit 263 which subtracts the computation results at the multiplying unit 261, which are $T_1/r$, from $U_1$, and a multiplying unit 263 which multiples the subtraction results of the subtracting unit 265, which are $U_1 - T_1/r$, by ½. The generated force computing unit 235 also includes a multiplying unit 262 which multiples $T_1$ by 1/r, an adding unit 264 which adds the computation results at the multiplying unit 262, which are $T_1/r$, to $U_1$, and a multiplying unit 266 which multiples the addition results of the adding unit 264, which are $U_1 + T_1/r$, by ½.

The setting unit 233 uses the above configuration to set the restricting coefficient $h_1$ so as to gradually approach 1 when in non-antagonistic driving when switching from non-antagonistic driving to antagonistic driving. Thus, smoothly changing the restricting coefficient $h_1$ enables antagonistic driving and non-antagonistic driving to be seamlessly transitioned.

Now, in a case where the gain of the feedback control system is high, the stiffness of the joint J1 accordingly becomes dominant. In a case where contact has occurred (i.e., in a case where the contact sensor 403 as detected contact), the gain adjusting unit 242 sets contact gain Gt=0 so as to cut off the feedback system illustrated in FIG. 4.

Accordingly, the stiffness of the link 101 (stiffness of the joint J1) can be quickly switched to the target stiffness $r_s$ at an optional point-in-time, such as having detected contact with a person or object.

In the first embodiment, the transfer function of the PID control unit 243 is as follows.

$$K_{PID1}(s) = \left(2.5 + \frac{2}{s} + \frac{0.14s}{1/(100 \cdot 2 \cdot \pi)s1}\right) \quad (13)$$

3. Simulation

Simulation was performed using the control system described above. The inertia moment of the link 101 was set to $I=8.3 \times 10^{-2}$ kgm², the moment arm radius of the link 101 to $r=0.1$ m, and the elastic constant and viscosity constant to $k=25$ and $b=1$, respectively. The target joint angle was set according to a ramp position is performed where the target joint angle $r_a=20$ degrees is reached in 2 seconds from the initial angle 0 degrees. At this time, the target stiffness of the joint J1 is controlled to $r_s = U_1 \times k \times r^2 = 0.8 \times k \times r^2$ Nm/rad. Now, since k and r are constants, it is sufficient to control $U_1$ which is the sum of generated force so as follows.

$$U_1 = 0.8 \quad (14)$$

Figure 5:
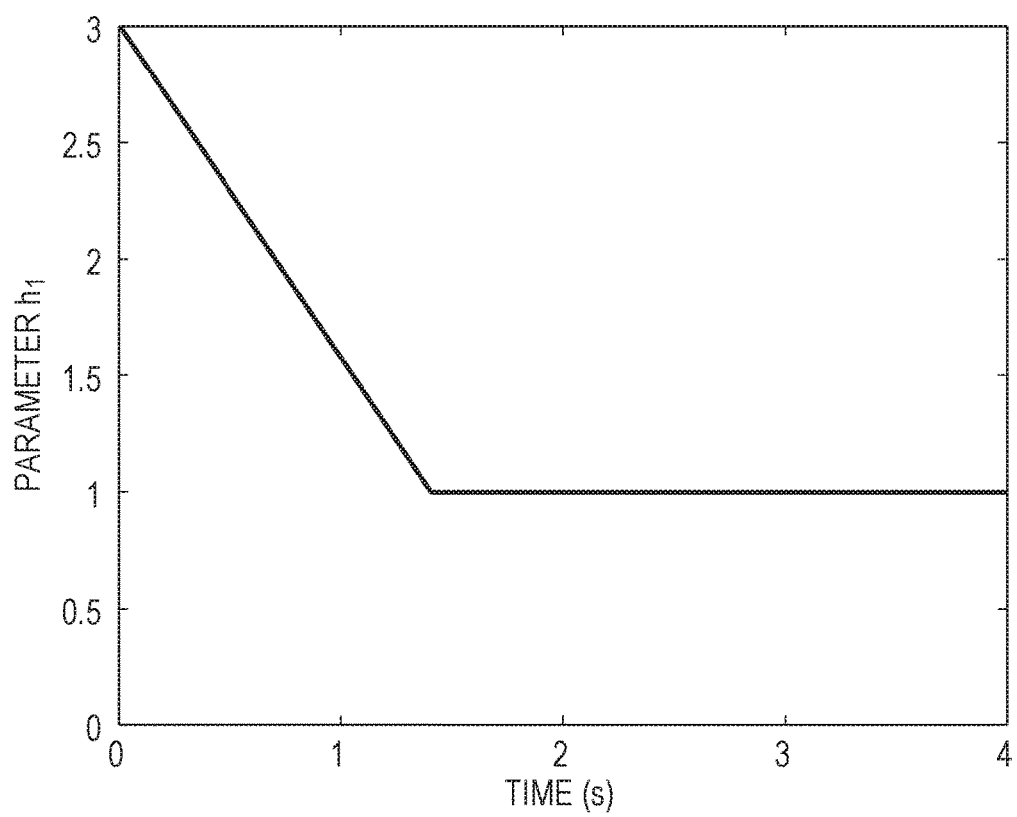
FIG. 5 is a diagram illustrating simulation results according to the first embodiment.

A great driving torque is necessary at the time of starting control, so in the present embodiment, non-antagonistic driving is performed at this time, and at the point of ending positioning antagonistic driving is performed to realize the desired joint stiffness. As illustrated in FIG. 5, the restricting coefficient (parameter) $h_1$ is set to $h_1 > 1$ at the time of starting control, $h_1$ is then gradually brought closer to 1, finally $h_1 = 1$ at 1.5 seconds later.

Figure 6A:
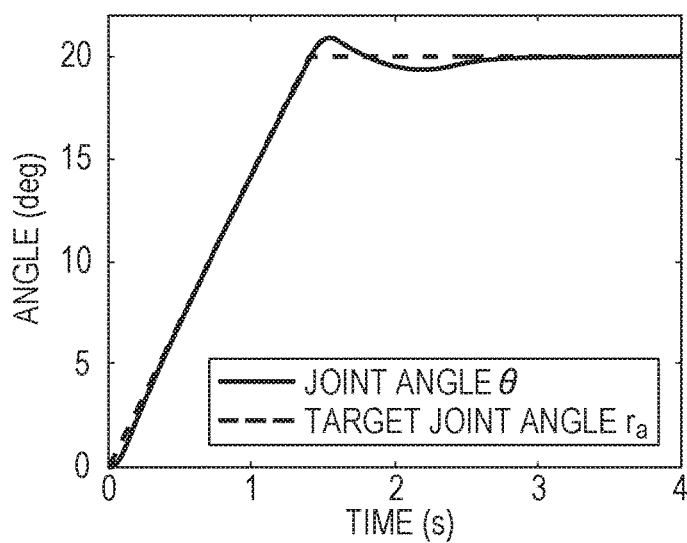
FIGS. 6A through 6C are diagrams illustrating simulation results according to the first embodiment.
Figure 6B:
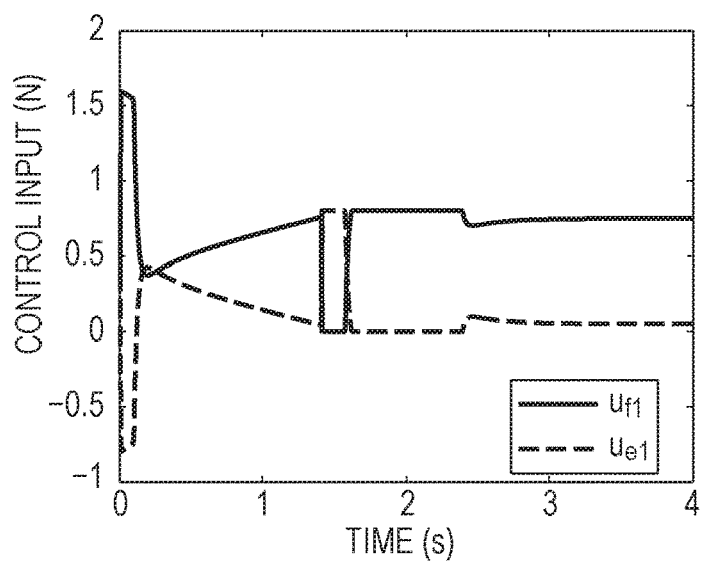
Figure 6C:
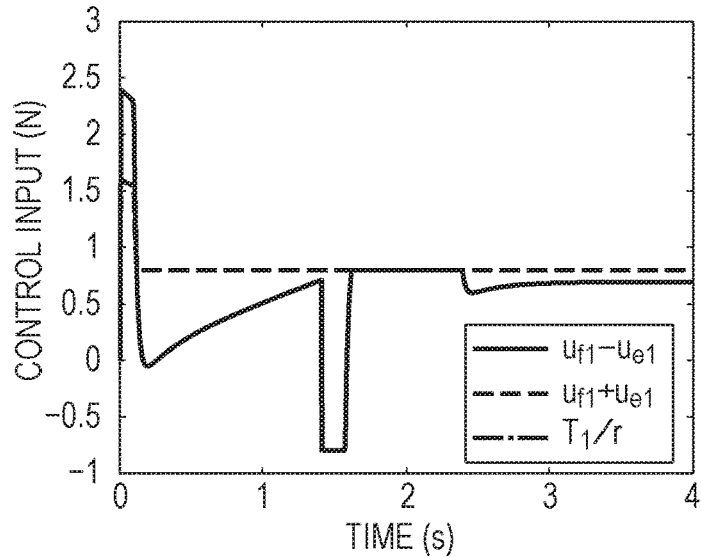

FIG. 6A is a graph illustrating the joint angle θ and target joint angle $r_a$. FIG. 6B is a graph illustrating response of generated force command values $u_{e1}$ and $u_{f1}$. FIG. 6C is a graph illustrating the difference, sum, and the response of $T_1/r$ of the generated force command values $u_{e1}$ and $u_{f1}$. In FIG. 6A, the joint angle θ represented by a solid line and the target joint angle $r_a$ by a broken line. In FIG. 6B, the response of the generated force command value $u_{e1}$ is represented by a broken line, and the response of the generated force command value $u_{f1}$ is represented by a solid line. In FIG. 6C, the difference of the generated force command values $u_{e1}$ and $u_{f1}$ is represented by a solid line, the sum by a broken line, and the response of $T_1/r$ by a single-dot dashed line.

FIG. 6A illustrates that the joint J1 is positioned at the target joint angle $r_a$. In FIG. 6B, the generated force command values $u_{e1}$ and $u_{f1}$ distribute the feedback control torque $T_1$ according to the conditions illustrated in Expressions (7) and (12).

When starting control, $h_1 > 1$ is set is non-antagonistic driving is performed, and accordingly the generated force command value $u_{e1}$ is a negative value. The unfolding side actuator generates pushing force, and the folding side actuator generates tensile force (contractile force). Accordingly, the maximum value of generated force at the folding side actuator can be reduced.

From 1.5 seconds after starting control, $h_1 = 1$ is set, whereby the generated force of both actuators $e_1$ and $f_1$ are positive values only. It can thus be understood that the state has transitioned to antagonistic driving.

Due to the antagonistic driving, the $u_{e1} + u_{f1} = U_1$ indicated by the broken line in FIG. 6C is at 0.8 from 1.5 seconds and thereafter, so it can be understood that the stiffness of the joint J1 is controlled to the target stiffness $r_s$ at the positioned target joint angle $r_a$. The $u_{e1} - u_{f1}$ indicated by the solid line in FIG. 6C is overlays the $T_1/r$ indicated by the single-dot dashed line, thus satisfying the conditions of Expression (3).

Second Embodiment

A second embodiment derives a 2-degree-of-freedom control system which incorporates a feed-forward control system, besides the feedback control system illustrated in the first embodiment. The feed-forward control system is derived so as to enable seamless transition between antagonistic driving and non-antagonistic driving, in the same way as with the feedback control system. Further, in the second embodiment, a 1-link manipulator model is derived taking backlash into consideration, as a model including backlash. Antagonistic driving is performed for the positioning target joint angle, so as to realize highly-precise positioning.

1. Modeling

Figure 7:
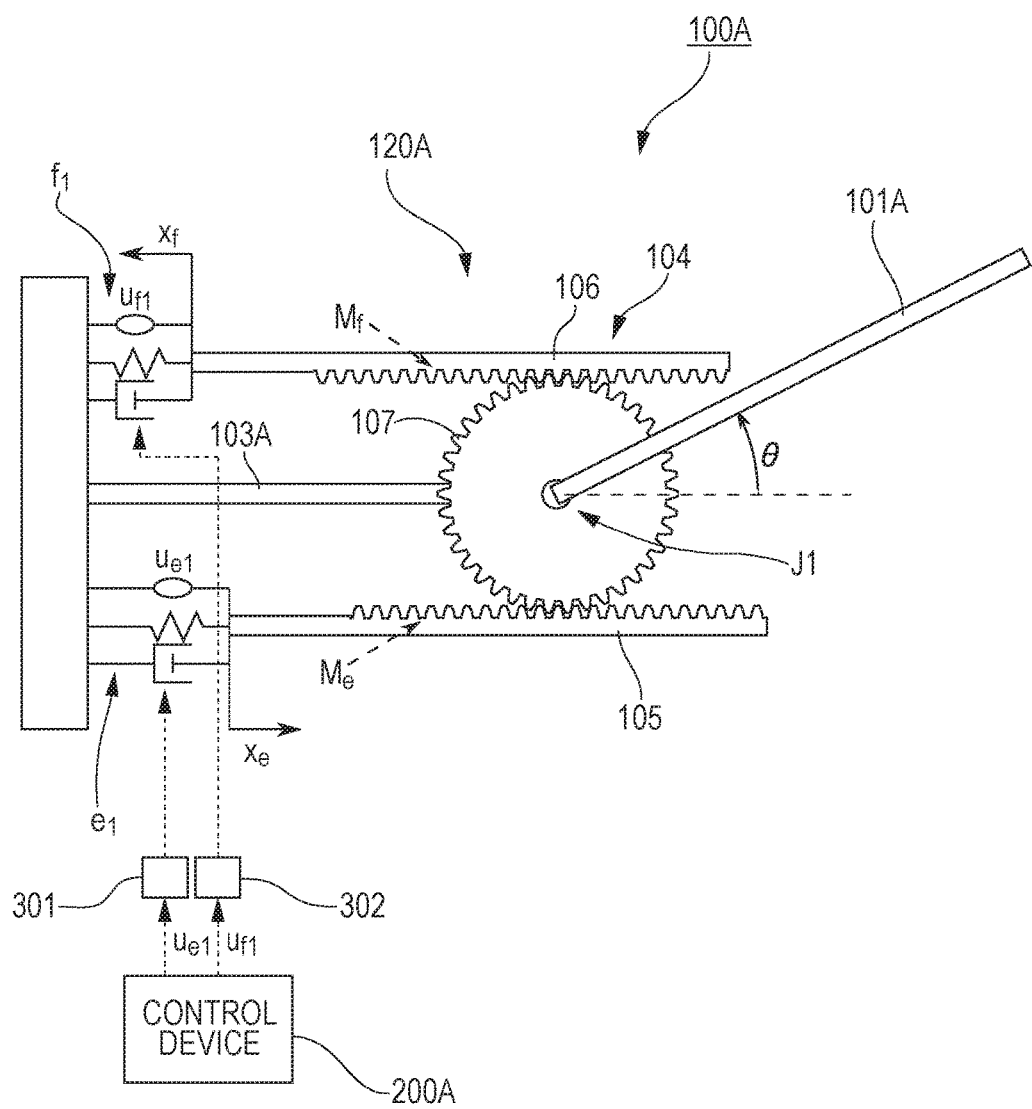
FIG. 7 is a schematic diagram illustrating a robot device according to a second embodiment.

FIG. 7 illustrates a robot device according to the second embodiment. The robot device 100A illustrated in FIG. 7 has what is known as a 1-link manipulator (hereinafter simply referred to as "manipulator") 120A. The manipulator 120A includes a link 101 which is a first link, actuators $e_1$ and $f_1$ which are a pair of first actuators, and a transmission mechanism 104 to transmit the generated force of the actuators $e_1$ and $f_1$ to the link 101A.

A base end of the link 101A is rotatably linked to a base 103 by the joint J1 which is a first joint.

The actuators $e_1$ and $f_1$ are parallel type VSAs molded by parallel connection of force generating element, elastic element, and viscous element. The actuators $e_1$ and $f_1$ are disposed on either side of the link 101A so that the link 101A is rotationally driven on the joint J1, and selectively generate one of tensile force and pushing force.

One end of the actuators $e_1$ and $f_1$ is foxed to the base 103A. The transmission mechanism 104 is a rack-and-pinion mechanism. The transmission mechanism 104 includes a pair of rack gears 105 and 106 fixed to the other end of the actuators $e_1$ and $f_1$, and a pinion gear 107 which is formed integrally with the base end of the link 101A and meshes with the pair of rack gears 105 and 106. Note that while the second embodiment will be described exemplifying an case where the transmission mechanism 104 is a rack-and-pinion mechanism, a chain and sprocket mechanism or the like may be used for the transmission mechanism 104.

In the second embodiment, a model is derived taking backlash of the transmission mechanism 104 into consideration, in addition to the properties of the actuators $e_1$ and $f_1$. In the same way as with the first embodiment described above, the generated force of the force generating elements which are the actuators $e_1$ and $f_1$ in antagonistic placement are $u_{e1}$ and $u_{f1}$ respectively. Also, the rotational angle of the link 101A, i.e., the joint angle of the joint J1 (first joint angle) is θ, the inertia moment of the link 101 is expressed as $I_0$, and the moment arm radius of the link 101A as r. Moreover, the mass of the rack gears 105 and 106 at the folding side and unfolding side in the transmission mechanism 104 are expressed as $M_e$ and $M_f$ respectively, as illustrated in FIG. 7. The direction of displacement of the transmission mechanism 104 is positive in the direction where the link 101 is driven in the positive direction of θ, and expressed as $x_e$ and $x_f$.

In the second embodiment, we will consider contact between the rack gears 105 and 106 of the transmission mechanism 104 connected to the actuators $e_1$ and $f_1$, and the pinion gear 107 fixed to the link 101A. We will express contact stiffness as $k_{ge}$ and $k_{gf}$. Contact attenuation may also be taken into consideration, but will be omitted in this deriving process.

The motion expression is derived as follows. If we say that $\theta_t$ is the angle of slack, and in a case where the motion expression regarding the folding side of the transmission mechanism 104 and the link 101A is $r \times \theta - x_f \leq -r \times \theta_t$ (case i), $$M_f \ddot{x}_f - k_{gf}(r\theta - x_f + r\theta_t) = u_f - ku_f x_f \tag{15}$$

$$I_0 \ddot{\theta} + k_{gf}(r\theta - x_f + r\theta_t) = 0 \tag{16}$$

holds.

In the case of $r \times \theta - x_f > r \times \theta_t$ (case ii), $$M_f \ddot{x}_f - k_{gf}(r\theta - x_f - r\theta_t) = u_f - ku_f x_f \tag{17}$$

$$I_0 \ddot{\theta} + k_{gf}(r\theta - x_f - r\theta_t) = 0 \tag{18}$$

holds.

In the case of $-r \times \theta_t < r \times \theta - x_f < r \times \theta_t$ (case iii), $$M_f \ddot{x}_f = u_f - ku_f x_f \tag{19}$$

$$I\ddot{\theta} = 0 \tag{20}$$

holds.

Now, matrix notation of $\theta_f = [x_f \ \theta]^T$ yields $$I_f \ddot{\theta}_f + k_f \theta_f + N_f \theta_t = [u_f - ku_f x_f \ 0]^T \tag{21}$$

where $$I_f = \begin{bmatrix} M_f & 0 \\ 0 & I_0 \end{bmatrix}, K_f = \begin{bmatrix} k_{gf} & -rk_{gf} \\ -k_{gf} & rk_{gf} \end{bmatrix} \text{(case } i, ii\text{)},$$

$$K_f = 0_{2 \times 2} \text{(case } iii\text{)}$$

$$N_f = r \begin{bmatrix} -k_{gf} \\ k_{gf} \end{bmatrix} \text{(case } i\text{)},$$

$$N_f = r \begin{bmatrix} k_{gf} \\ -k_{gf} \end{bmatrix} \text{(case } ii\text{)}, N_f = 0_{2 \times 1} \text{(case } iii\text{)}$$

holds.

In the same way, the motion equation of the mechanism at the unfolding side in the transmission mechanism 104 and the link 101A is $$I_e \ddot{\theta}_e + k_e \theta_e + N_e \theta_t = [0 - u_e - ku_e x_e]^T \tag{22}$$

where $r \times \theta - x_e < -r \times \theta_t$ (case iv), $r \times \theta - x_e > r \times \theta_t$ (case v), $-r \times \theta_t < r \times \theta - x_e < r \times \theta_t$ (case vi), and $\theta_e = [\theta x_e]^T$.

Now, $$I_e = \begin{bmatrix} I_0 & 0 \\ 0 & M_e \end{bmatrix},$$

$$K_e = \begin{bmatrix} rk_{ge} & -k_{ge} \\ -rk_{ge} & k_{ge} \end{bmatrix} \text{(case } iv, v\text{)},$$

$$K_e = 0_{2 \times 2} \text{(case } vi\text{)}$$

$$N_e = r \begin{bmatrix} k_{ge} \\ -k_{ge} \end{bmatrix} \text{(case } iv\text{)},$$

$$N_e = r \begin{bmatrix} -k_{ge} \\ k_{ge} \end{bmatrix} \text{(case } v\text{)},$$

$$N_e = 0_{2 \times 1} \text{(case } vi\text{)}$$

holds.

Thus, from Expressions (21) and (22), the motion equation for the entire system of both sides of the transmission mechanism 104 and the link 101A is as follows.

$$I_a \ddot{\theta}_a + K_a \theta_a + N_a \theta_t = [u_f - ku_f x_f \ 0 - u_e - ku_e x_e]^T \tag{23}$$

where $\theta_a = [x_f \theta x_e]^T$.

Now, $$I_a = \begin{bmatrix} M_f & 0 & 0 \\ 0 & I & 0 \\ 0 & 0 & M_e \end{bmatrix}, \tag{24}$$

$$K_a = \begin{bmatrix} K_{f(1,1)} & K_{f(1,2)} & 0 \\ K_{f(2,1)} & K_{f(2,2)} + K_{e(1,1)} & K_{e(1,2)} \\ 0 & K_{e(2,1)} & K_{e(2,2)} \end{bmatrix}$$

$$N_a = \begin{bmatrix} N_{f(1,1)} \\ N_{f(2,1)} + N_{e(1,1)} \\ N_{e(2,1)} \end{bmatrix}$$

holds.

2. Control System

The robot device 100A includes a control device 200A, and two drivers 301 and 302 which respectively drive the actuators $e_1$ and $f_1$, based on the generated force command values $u_{e1}$ and $u_{f1}$ from the control device 200A.

The control device 200A generates the generated force command values $u_{e1}$ and $u_{f1}$ corresponding to the respective actuators $e_1$ and $f_1$. The control unit 200A then outputs the generated force command values $u_{e1}$ and $u_{f1}$ to the drivers 301 and 302, thereby controlling the generated force of the actuators $e_1$ and $f_1$. The device configuration of the control device 200A is the same as that of the control device 200 (FIG. 3) described in the first embodiment, so detailed description will be omitted. In the second embodiment, the control operations of the CPU 201 based on the program 221A illustrated in FIG. 3 are different from those of the program 221 described in the first embodiment.

Figure 8:
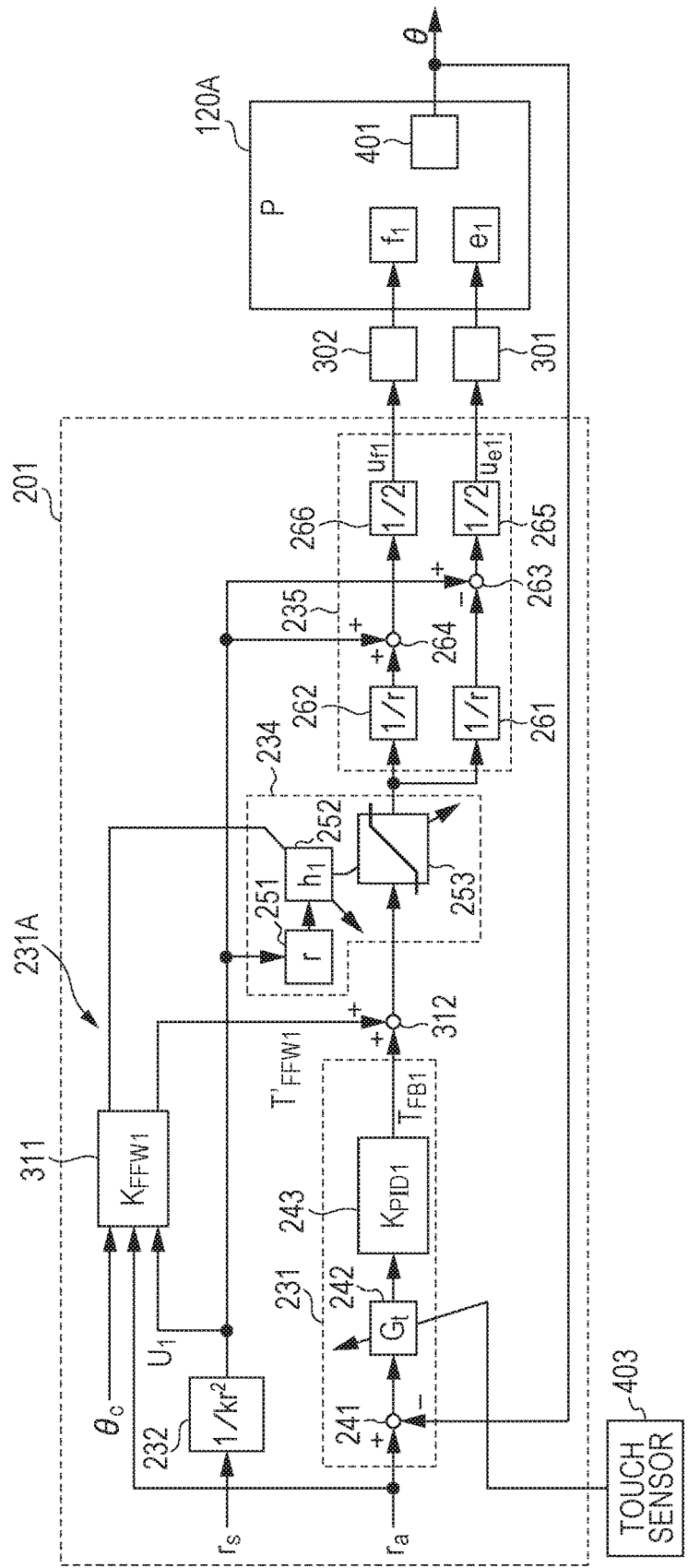
FIG. 8 is a functional block line diagram for describing control operations of a CPU according to the second embodiment.

FIG. 8 is a functional block line diagram for describing the control operations of the CPU 201 illustrated in FIG. 3. A robot control method will now be described with reference to FIG. 8. Note that in FIG. 8, the manipulator 120A is denoted by reference symbol P. The CPU (control unit) 201 of the control device 200A functions as each part illustrated in FIG. 8 by reading out the program 221A from the HDD 204 and executing the program 221A.

That is to say, the CPU 201 functions as a joint torque computing unit 231A which executes first joint torque computation processing, the summing unit 232 which executes first summing processing, the setting unit 233 which executes first setting processing, and the restricting unit 234 which executes first restricting processing, based on the program 221A. The CPU 201 further functions as the generated force computing unit 235 which executes first generated force computing processing, based on the program 221A.

In the second embodiment, at the time of starting driving of the manipulator 120A one actuator is constricted (tensed) while the other actuator is driven so as to push, thereby effectively using limited actuator output. Further, when stabilized, the two actuators $e_1$ and $f_1$ are subjected to antagonistic driving, thereby compensating for backlash in the mechanism, and performing highly precise positioning.

In the second embodiment, feed-forward control torque is provided to the generated force command values $u_{e1}$ and $u_{f1}$ in addition to the feedback control torque, enabling the join angle to track the target trajectory in a highly precise manner, while controlling stiffness of the joint at the same time. The target trajectory of the joint is expressed as $r_a$, and the target stiffness as $r_s$.

2.1 Feed-Forward Control System Design

In this section, a method for deriving feed-forward control torque to be provided to the generated force command values $u_{e1}$ and $u_{f1}$ will be described. First, we will say that the difference of the generated force command values $u_{e1}$ and $u_{f1}$ is $T_{FFW1}$, and the sum is $U_1$.

$$(u_{f1}-u_{e1})r=T_{FFW1} \tag{25}$$

$$u_{f1}+u_{e1}=U_1 \tag{26}$$

$U_1$ is determined as $$U_1=r_s/kr^2 \tag{27}$$

in the second embodiment as well, since the target stiffness of the joint J1 is $r_s$.

That is to say, the summing unit 232 obtains the sum value $U_1$ represented the sum of generated forces generated by the actuators $e_1$ and $f_1$, based on the relational expression of Expression (27), from the target stiffness $r_s$ (first summing step).

The joint torque computing unit 231A computes joint torque for the joint J1 (first joint torque) $T_1$ necessary for setting the joint angle θ to the target joint angle $r_a$ (first joint torque computing step). In this second embodiment, the joint torque computing unit 231A includes the feedback computing unit 231 including the difference computing unit 241, the gain adjusting unit 242, and the PID control unit 243, and also includes a feed-forward computing unit 311 and adding unit 312.

The feed-forward computing unit 311 executes feed-forward computing processing to obtain the feed-forward control torque $T_{FFW1}$ for the joint J1, using the sum value $U_1$, target joint angle $r_a$, and viscoelasticity constants k and b of the actuators $e_1$ and $f_1$.

The feedback computing unit 231 performs feedback computing the same as with the first embodiment described above, to obtain the feedback control torque $T_{FB1}$.

The adding unit 312 then adds the feedback control torque $T_{FB1}$ to the feed-forward control torque $T_{FFW1}$ so as to perform adding processing to obtain the joint torque $T_1$.

If we express the angular velocity and angular acceleration of the target joint angle (target trajectory) $r_a$ as $\dot{r}_a, \ddot{r}_a$ the feed-forward control torque $T_{FFW1}$ for the joint angle θ to track the target trajectory $r_a$ is obtained as follows.

$$T_{FFW1}=I\ddot{r}_a+U_1kr^2r_a+U_1br^2\dot{r}_a \tag{28}$$

Solving Expressions (25) and (26) regarding the generated force command values $u_{e1}$ and $u_{f1}$ yields the following.

$$u_{f1}=\frac{U_1+T_{FFW1}/r}{2}, u_{e1}=\frac{U_1+T_{FFW1}/r}{2} \tag{29}$$

In the same way as with the antagonistic driving conditions in the first condition, a zone where $T_{FFW1}$ satisfies the conditions of $$|T_{FFW1}|<U_1r \tag{30}$$

is $u_{f1}>0$, $u_{e1}>0$, where antagonistic driving is performed.

However, in a zone where the conditions of Expression (30) are not satisfied, the value of one or the other of the generated force command values $u_{e1}$ and $u_{f1}$ becomes a negative value, so the force generating element generates pushing force. At this time, the viscoelasticity constant in the viscoelasticity model of the muscle is negative from Expression (1), but realizing negative viscoelasticity in a mechanical system is difficult. Accordingly, we will remove the restrictions on the target stiffness of the joint for zones where the generated force is negative, so that the viscoelasticity constant of the parallel type VSA is 0.

Accordingly, a zone where $u_{f1}<0$ is rewritten as follows.

$$T_{FFW1f}=I\ddot{r}_a+u_{e1}kr^2r_a+u_{e1}br^2\dot{r}_a \tag{31}$$

Also, a zone where $u_{e1}<0$ is rewritten as follows.

$$T_{FFW1e}=I\ddot{r}_a+u_{f1}kr^2r_a+u_{f1}br^2\dot{r}_a \tag{32}$$

Based on Expression (28) we will express feed-forward control torque where a zone in which Expression (30) is not satisfied has been substituted by $T_{FFW1f}$ or $T_{FFW1e}$ as $T_{FFW1}'$. Substituting this into the distribution Expression (33) again yields generated force command values as follows.

$$u_{f1}'=\frac{U_1+T_{FFW1}'/r}{2}, u_{e1}'=\frac{U_1+T_{FFW1}'/r}{2} \tag{33}$$

That is to say, the feed-forward computing unit 311 computes the feed-forward control torque $T_{FFW1}$ by inverse dynamics, and determines whether or not $|T_{FFW1}|<U_1 \times r$ is satisfied. In the event that these conditions are not satisfied, the feed-forward computing unit 311 computes the feed-forward control torque $T_{FFW1}'$ by inverse dynamics again, having set the viscoelasticity constants k and b for the actuator regarding which the generated force is a negative value.

The above derivation assumes that the elasticity of the muscle occurs proportionate to the angle from θ=0 degrees. In order to generate feed-forward control input with an optional angle as the reference angle for elasticity to occur at the muscle (hereinafter "neutral angle") the following expression can be used instead of Expression (28), $$T_{FFW1}=I\ddot{r}_a+U_1kr^2(r_a-\theta_c)+U_1br^2\dot{r}_a \tag{34}$$

where $\theta_c$ represents the neutral angle.

2.2 2-Degree-of-Freedom Control System

FIG. 8 illustrates the feed-forward control system as $K_{FFW1}$. The PID control unit 243 indicated by the transfer function $K_{PID1}$ in the feedback control system outputs control input torque $T_{FB1}$ to compensate for error between the joint angle θ and target joint angle $r_a$, as described in the first embodiment. Determining the generated force command values $U_{e1}$ and $u_{f1}$ so that $$(u_{f1}-u_{e1})r=T'_{FFW1}+T_{FB1}=T'_1 \tag{35}$$

is satisfied yields the joint torque $T_1'$, which is the sum of the feed-forward control torque $T'_{FFW1}$ and feedback control torque $T_{FB1}$, for the joint J1.

The joint torque $T_1'$ and sum value $U_1$ can be satisfied at the same time by solving Expressions (35) and (5) for $u_{e1}$ and $u_{f1}$, and determining the following.

$$u_{f1}=\frac{U_1+T_1'/r}{2}, u_{e1}=\frac{U_1+T_1'/r}{2} \tag{36}$$

However, feed-forward control by non-antagonistic driving is performed in zones where the conditions given in Expression (30) are not satisfied. The antagonistic driving conditions may be removed for the feedback control system.

Accordingly, in the second embodiment, the parameter $h_1$ which adjust the antagonistic degree as described in the first embodiment (restricting coefficient) is automatically generated such that $h_1=1$ in a zone where conditions given in Expression (30) are satisfied, and $h_1=10$ if not satisfied. Now, discontinuity in switching between $h_1=1$ and $h_1=10$ is a cause of chattering occurring in the control input at the time of transitioning between antagonistic driving and non-antagonistic driving. Accordingly, the feed-forward computing unit 311 runs the generated parameter $h_1$ through a zero phase low-pass filter beforehand. Further, restriction of $$|T'_1| < U_1 r h_1 \quad (37)$$

is applied in the same way as with the first embodiment, whereby transition between antagonistic driving and non-antagonistic driving can be performed seamlessly.

2.3 Trajectory Design

Figure 9A:
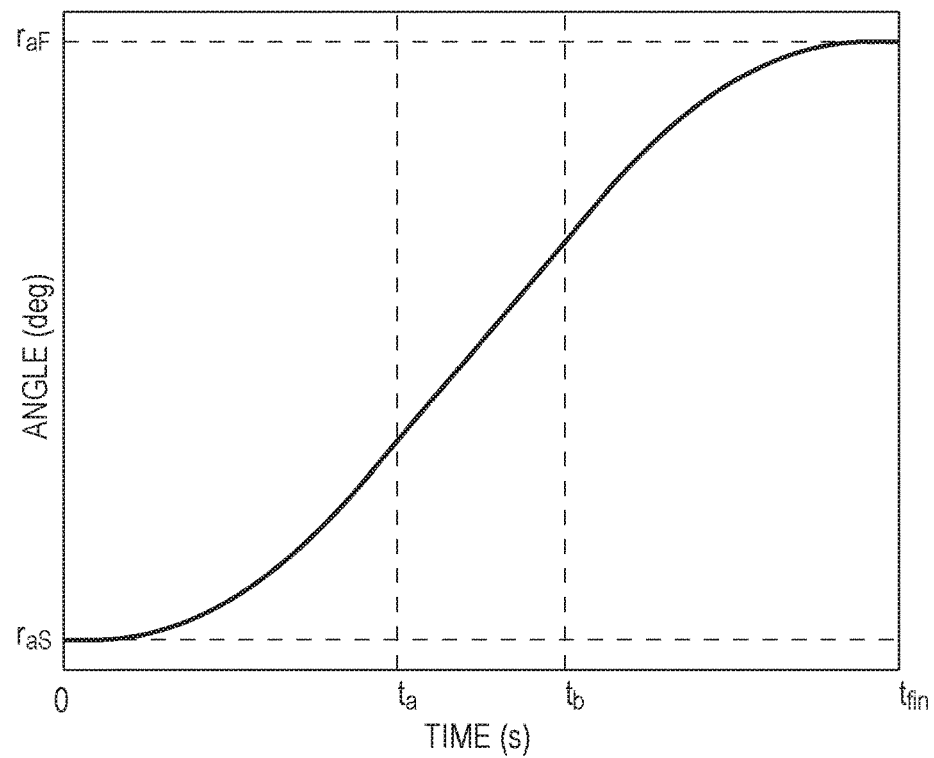
FIGS. 9A and 9B are diagrams illustrating trajectory design according to the second embodiment.
Figure 9B:
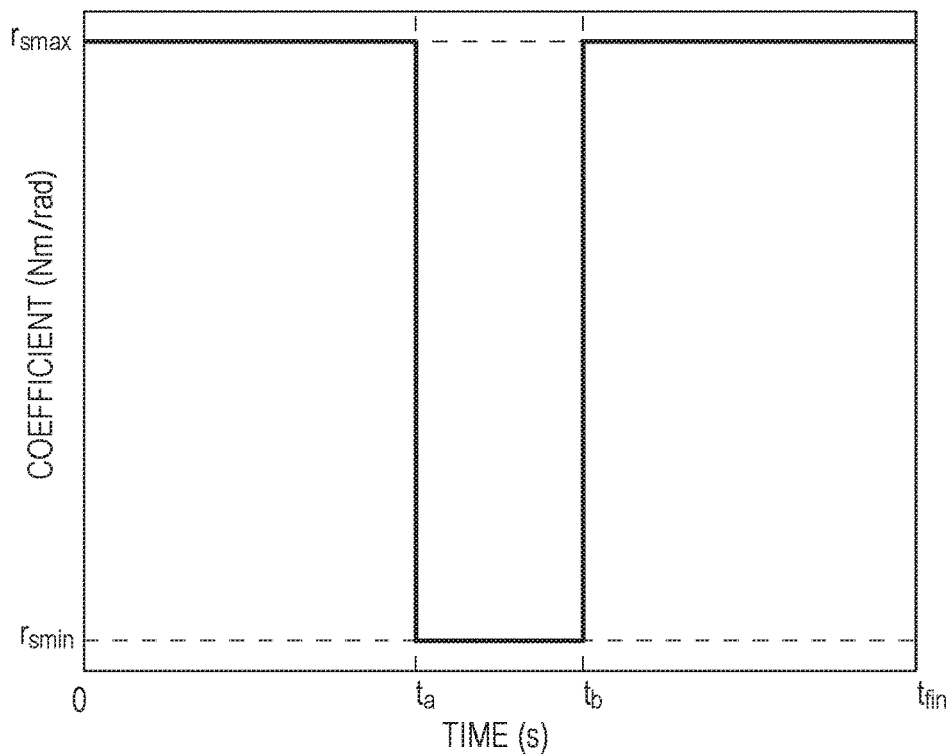

Next, a design method for the target trajectory $r_a$ and target stiffness $r_s$ of the joint J1 will be described. In the second embodiment, the target trajectory angle $r_a$ uses a trajectory having an acceleration zone, a constant velocity zone, and a deceleration zone, as illustrated in FIG. 9A. Here, $r_{aS}$ and $r_{aF}$ are the initial angle and target angle of the trajectory, respectively. Also, $t_a$, $t_b$, and $t_{fin}$ are the starting time of the constant velocity zone, ending time of the constant velocity zone, and ending time of positioning. Further, the target stiffness $r_s$ is set such that high stiffness $r_{smax}$ is achieved during the acceleration and deceleration zones, and low stiffness $r_{smin}$ at the constant velocity zone, as illustrated in FIG. 9B. Due to changing the stiffness, at the time of starting driving the manipulator 120A is accelerated by elastic force of the muscle, and in the constant velocity zone is driven mostly by inertial due to the low stiffness. Accordingly, driving using little muscle force generation is enabled.

In the second embodiment, trajectory having an acceleration zone, a constant velocity zone, and a deceleration zone has been described, but a trajectory not having a constant velocity zone, such as a minimum jerk trajectory for example, may be used. Further, the target stiffness may be constant in a case where efficiency of driving is not taken into consideration.

3. Simulation

Simulation was performed using the control system described above. The inertia moment of the link 101A was set to $I=8.3 \times 10^{-2}$ kgm$^2$, the moment arm radius to $r=0.1$ m, and the elastic constant and viscosity constant to $k=25$ and $b=3$, respectively. The target trajectory $r_a$ was set such that initial angle $r_{aS}=0$ degrees, target angle $r_{aF}=20$ degrees, constant velocity zone starting time $t_a=0.35$ seconds, constant velocity zone ending time $t_b=0.45$ seconds, and positioning ending time $t_{fin}=0.8$ seconds. The target stiffness for the joint J1 was $r_{smax}=2.3 \times k \times r^2$ Nm/rad, $r_{smin}=0.8 \times k \times r^2$ Nm/rad. Now, since k and r are constants, it is sufficient to control $U_1$ which is the sum of generated force so as to be $U_1=2.3$ in the acceleration and deceleration zones and $U_1=0.8$ in the constant velocity zone.

Figure 10A:
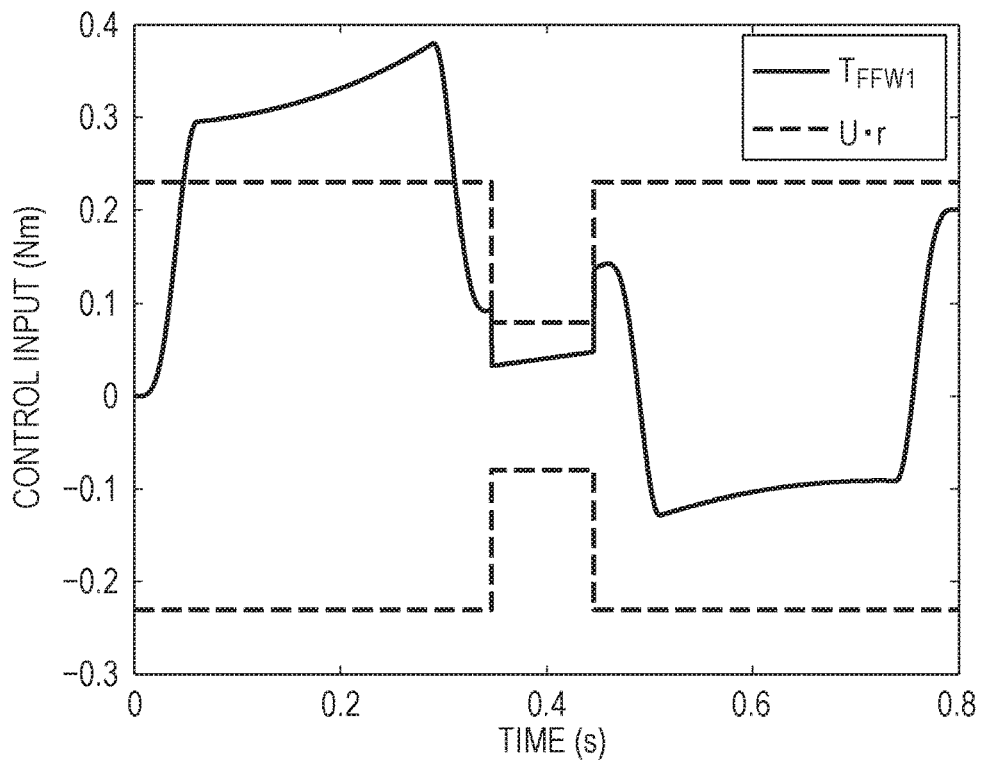
FIGS. 10A and 10B are diagrams illustrating simulation results according to the second embodiment.
Figure 10B:
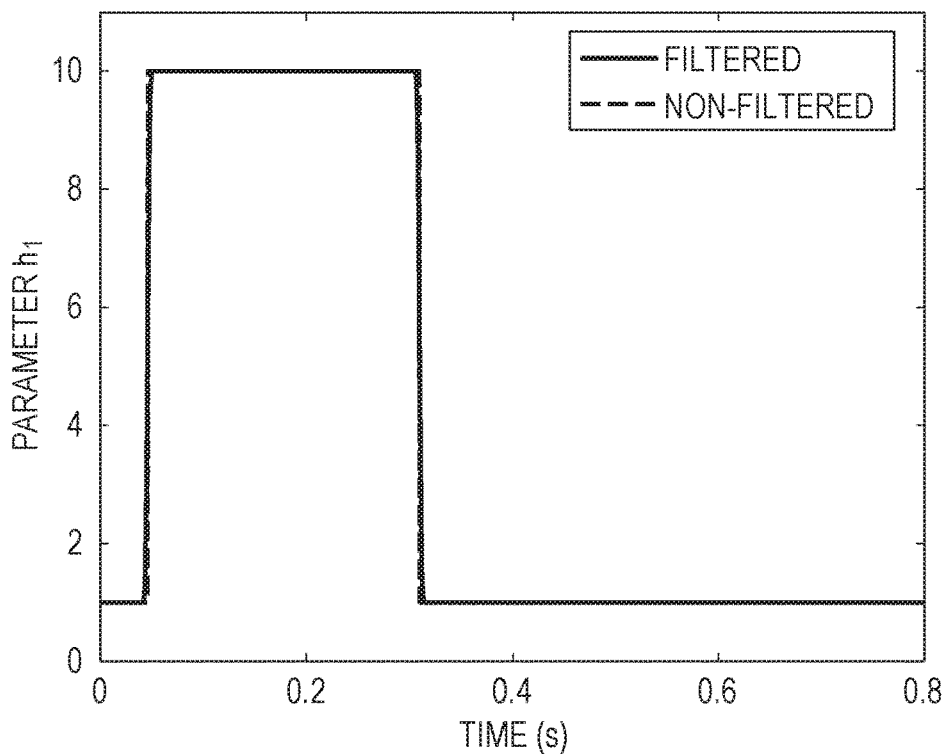

In FIG. 10A, the feed-forward control torque $T_{FFW1}$ derived from the target trajectory $r_a$ by the procedures illustrated in section 2.1 is illustrated by the solid line, and the product of the target stiffness and moment arm by the broken line. In FIG. 10A, the conditions given in Expression (30) are not satisfied in the zone from approximately 0.05 seconds to 0.3 seconds, so non-antagonistic driving is performed in this zone. FIG. 10B illustrates the parameter $h_1$ for adjusting the degree of antagonism.

In the second embodiment, $h_1=10$ is set when non-antagonistic driving, so that the parameter is first generated as indicated by the broken line, and further, a zero phase low-pass filter is used to prevent rapid switching. This parameter $h_1$ is indicated by a solid line. Accordingly, efficient acceleration is performed during non-antagonistic driving in the acceleration zone from the start of control, and seamlessly transitions to antagonistic driving in the deceleration zone, thus generating feedback control torque to compensate for backlash of the mechanism.

Next, response according to the 2-degree-of-freedom control using the feedback torque control will be described. FIG. 11A illustrates the joint angle θ and target trajectory $r_a$ by a solid line and broken line, respectively, and FIG. 11B illustrates the response of the generated force command values $u_{e1}$ and $u_{f1}$ by a solid line and broken line, respectively. Further, FIG. 11C illustrates the difference between generated force command values $u_{e1}$ and $u_{f1}$ by a solid line and the sum by a broken line, and the response of $T_1'/r$ by a single-dot dashed line. FIG. 11D illustrates the feed-forward control torque $T'_{FFW1}$ by a solid line, and the feedback control torque $T_{FB1}$ by a broken line.

The joint angle illustrated by the solid line in FIG. 11A nearly overlays the trajectory illustrated by the broken line, indicating that the joint J1 is tracking the target trajectory. In FIG. 11B, the generated force $u_{f1}$ of the actuator $f_1$ at the folding side, indicated by the solid line, constantly maintains a positive value. On the other hand, the generated force $u_{e1}$ of the actuator $e_1$ at the unfolding side, indicated by the broken line, takes a negative value in zones where the parameter $h_1$ for adjusting the degree of antagonism, illustrated in FIG. 10 is greater than 1. This is because the actuator $e_1$ at the unfolding side is generating pressing force. After 0.36 seconds where the parameter $h_1$ becomes 1, the control transitions to antagonistic driving, where it can be seen that both actuators $e_1$ and $f_1$ are generating tensile force (contractile force). This antagonistic driving compensates for backlash in the transmission mechanism 104, so positioning can be made to the target angle in a precise angle. Further, in FIG. 11C, the $u_{e1}+u_{f1}=U_1$ indicated by the broken line is 2.3 in the acceleration and deceleration zones after 0.36 seconds, and 0.8 in the constant velocity zone, so it can be seen that the stiffness of the joint J1 is being controlled to the target value. Also, the $u_{e1}-u_{f1}$ indicated by the solid line overlays the $T_1'/r$ indicated by the single-dot dashed line, which satisfies the conditions of Expression (3).

Figure 12:
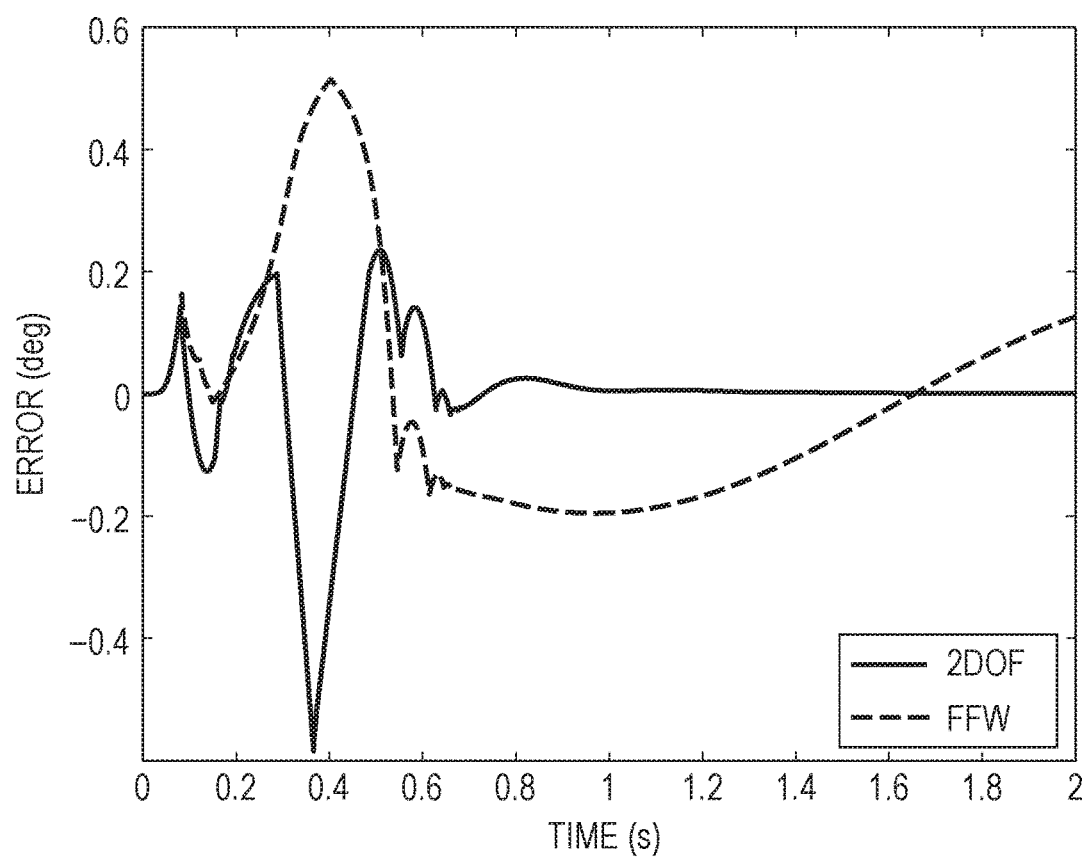
FIG. 12 is a diagram illustrating simulation results according to the second embodiment.

FIG. 12 illustrates a comparison with tracking error of 2-degree-of-freedom control and feed-forward control alone. In the case of feed-forward control alone, the backlash of the transmission mechanism 104 is the model error, so great error occurs. With 2-degree-of-freedom control, the feedback control system compensates for the modeling error, so it can be seen that precise positioning control can be performed.

According to the second embodiment, acceleration is performed at the time of starting driving by non-antagonistic driving, and transitioning to antagonistic driving when stable compensates for the backlash of the mechanism, so highly precise positioning can be performed.

Third Embodiment

Next, description will be made regarding a robot device according to a third embodiment of the present invention.

1. Modeling

Figure 13:
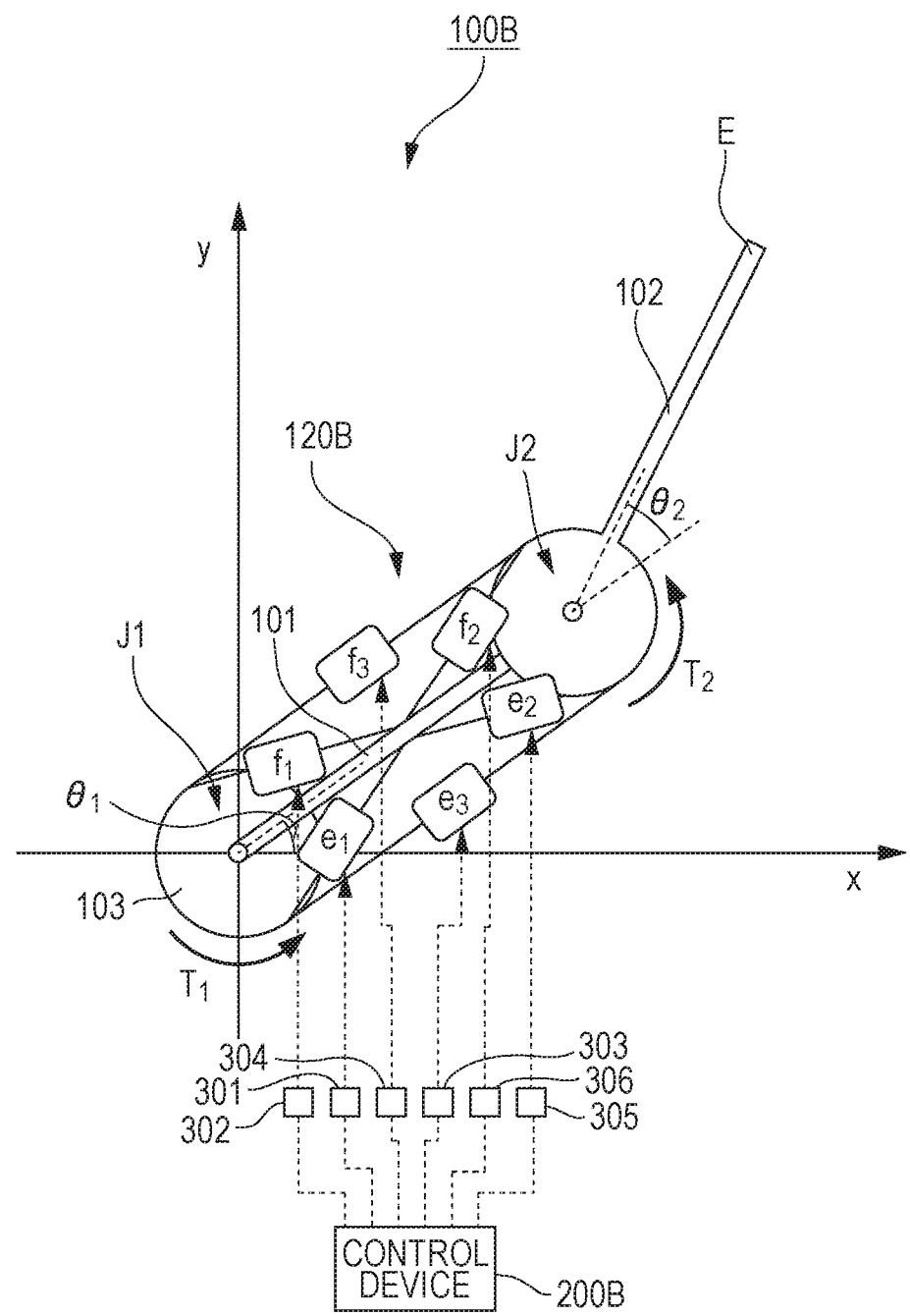
FIG. 13 is a schematic diagram illustrating a robot device according to a third embodiment.

FIG. 13 is a schematic diagram illustrating a robot device according to the third embodiment. The robot device 100B includes a manipulator 120B, a control device 200B, and six drivers 301 through 306. In the third embodiment, the manipulator 120B is controlled regarding joint angle and stiffness at the same time, which involves transition of antagonistic driving and non-antagonistic driving.

The manipulator 120B is a "three-pair six-muscle model" two-link manipulator, having a link (first link) 101 rotatably linked to the base 103 by a joint (first joint) J1, and a link (second link) 102 rotatably linked to the link 101 by a joint (second joint) J2.

The manipulator 120B also includes a pair of actuators (first actuators) $e_1$ and $f_1$ disposed on either side of the link 101 so as to rotationally drive the link 101 on the joint J1. The manipulator 120B further includes a pair of actuators (second actuators) $e_2$ and $f_2$ disposed on either side of the link 102 so as to rotationally drive the link 102 on the joint J2. Moreover, the manipulator 120B includes a pair of actuators (third actuators) $e_3$ and $f_3$ disposed on either side of the links 101 and 102 so as to rotationally drive the links 101 and 102 on the joints J1 and J2 at the same time.

The pair of actuators $e_3$ and $f_3$ are bi-articular simultaneously driving actuators disposed to drive the link 101 and link 102 at the same time. Bi-articular simultaneously driving actuators are actuators disposed so as to drive the first link and second link at the same time. The human body is known to include bi-articular simultaneously driving actuators in the upper arms and thighs called bi-articular muscles. While the array of muscles in human limbs is complicated, a working concept of the muscles has been introduced to propose a two-link model according to a "three-pair six-muscle model" such as illustrated in FIG. 13. Note that actuators which drive a single link, such as the antagonistic pair of actuators $e_1$ and $f_1$ and the antagonistic pair of actuators $e_2$ and $f_2$, are called mono-articular driving actuators.

The actuators $e_1$, $f_1$, $e_2$, $f_2$, $e_3$, and $f_3$ are actuators having the muscle viscoelastic properties illustrated in FIG. 1 as described in the first embodiment. That is to say, the actuators $e_1$, $f_1$, $e_2$, $f_2$, $e_3$, and $f_3$ are modeled after parallel connection of a force generating element, an elastic element, and a viscoelastic element, and selectively generate one of tensile force and pushing force.

Let us say that $u_{en}$ and $u_{fn}$ (n=1, 2, 3) are generated forces of force generating elements (generated force command values), and $k_{en}$, $k_{fn}$, $b_{en}$, and $b_{fn}$ (n=1, 2, 3) are elastic force constants and viscosity force constants of the actuators. We will also say that the rotational angles of the links 101 and 102 (e.g., the joint angles of the joints J1 and J2) are $\theta_1$ and $\theta_2$. We will further say that the inertia moments of the links 101 and 102 are $I_1$ and $I_2$, the lengths of the links 101 and 102 are $l_1$ and $l_2$, and the mass of the links 101 and 102 are $m_1$ and $m_2$, the moment arm radius is r for both the links 101 and 102. If we say that the elastic force constant and viscosity force constant of the muscles are k and b respectively in the third embodiment, the motion equation is as follows.

$$(m_1 l_1^2 + I_1 + 4m_2 l_1 l_2 \cos\theta_2 + m_2 l_2^2 + I_2)\ddot{\theta}_1 + \quad (38)$$
$$(m_2 l_2^2 + I_2 + 2m_2 l_1 l_2 \cos\theta_2)\ddot{\theta}_2 - 2m_2 l_1 l_2 (2\dot{\theta}_1 + \dot{\theta}_2)\sin\theta_2 \dot{\theta}_2 =$$
$$(u_{f1} - u_{e1})r - (u_{f1} + u_{e1})kr^2\theta_1 - (u_{f1} + u_{e1})br^2\dot{\theta}_1 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

$$(m_2 l_2^2 + I_2 + 2m_2 l_1 l_2 \cos\theta_2)\ddot{\theta}_1 + (m_2 l_2^2 + I_2)\ddot{\theta}_2 + 2m_2 l_1 l_2 \sin\theta_2 \dot{\theta}_1^2 = \quad (39)$$
$$(u_{f2} - u_{e2})r - (u_{f2} + u_{e2})kr^2\theta_2 - (u_{f2} + u_{e2})br^2\dot{\theta}_2 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

2. Control Design

Figure 14:
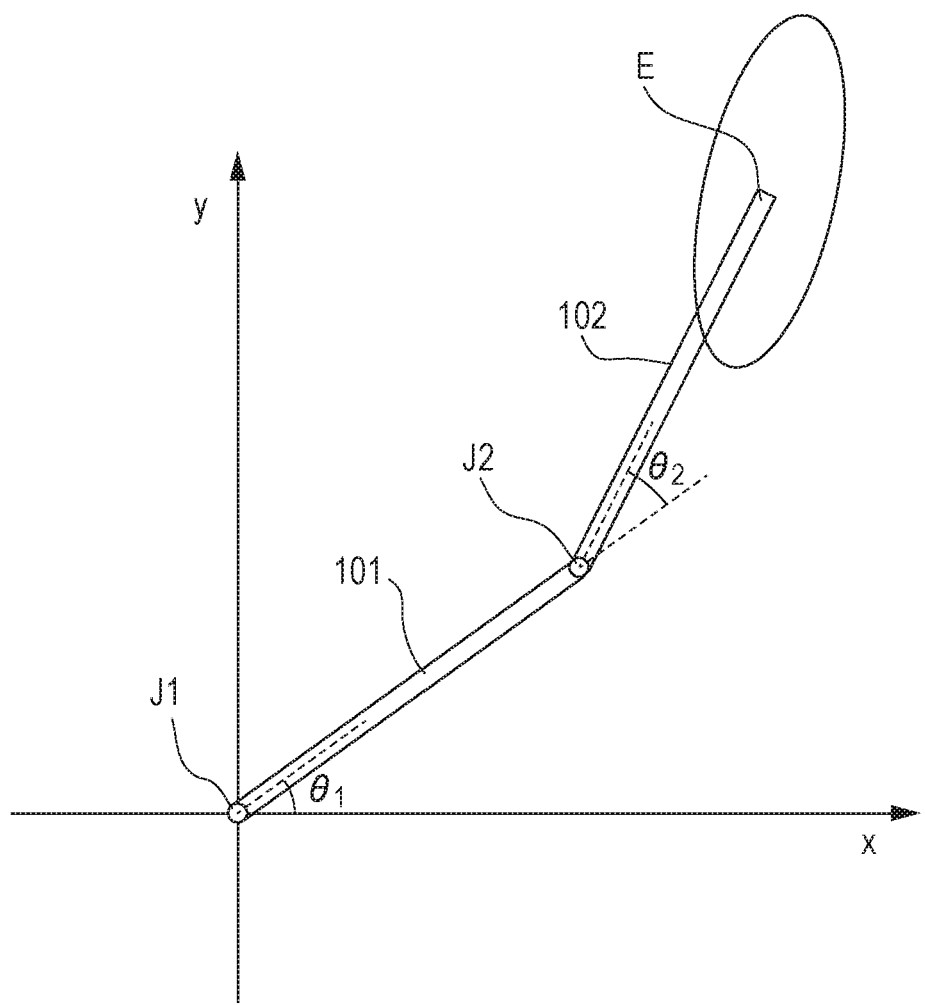
FIG. 14 is a diagram for describing a stiffness ellipse according to the third embodiment.

Simultaneous control of the angles and stiffness of the joints J1 and J2 is performed in the third embodiment, in the same way that simultaneous control of the angle and stiffness of the joints J1 and J2 was performed in the first and second embodiments. Note however, that the end effector E, which is the tip of the link 2 of the two-link manipulator 120B comes into direct contact with the outside world, so control of the stiffness of the end effector E is important. The stiffness of the end effector E is expressed by a stiffness ellipse such as illustrated in FIG. 14. This ellipse represents the distribution of stiffness in various directions, and indicates that the greater the distance between the end effector E and the ellipse is, the greater the stiffness is.

The control device 200B generates generated force command values $u_{e1}$, $U_{f1}$, $u_{e2}$, $u_{f2}$, $u_{e3}$, and $u_{f3}$ corresponding to the actuators $e_1$, $f_1$, $e_2$, $f_2$, $e_3$, and $f_3$. The control device 200B then outputs the generated force command values $u_{e1}$, $u_{f1}$, $u_{e2}$, $u_{f2}$, $u_{e3}$, and $u_{f3}$ to the drivers 301 through 306, thereby controlling the generated force of the actuators $e_1$, $f_1$, $e_2$, $f_2$, $e_3$, and $f_3$. The drivers 301 through 306 generate at the actuators $e_1$, $f_1$, $e_2$, $f_2$, $e_3$, and $f_3$ the generated force corresponding to the generated force command values $u_{e1}$, $U_{f1}$, $u_{e2}$, $u_{f2}$, $u_{e3}$, and $u_{f3}$.

Figure 15:
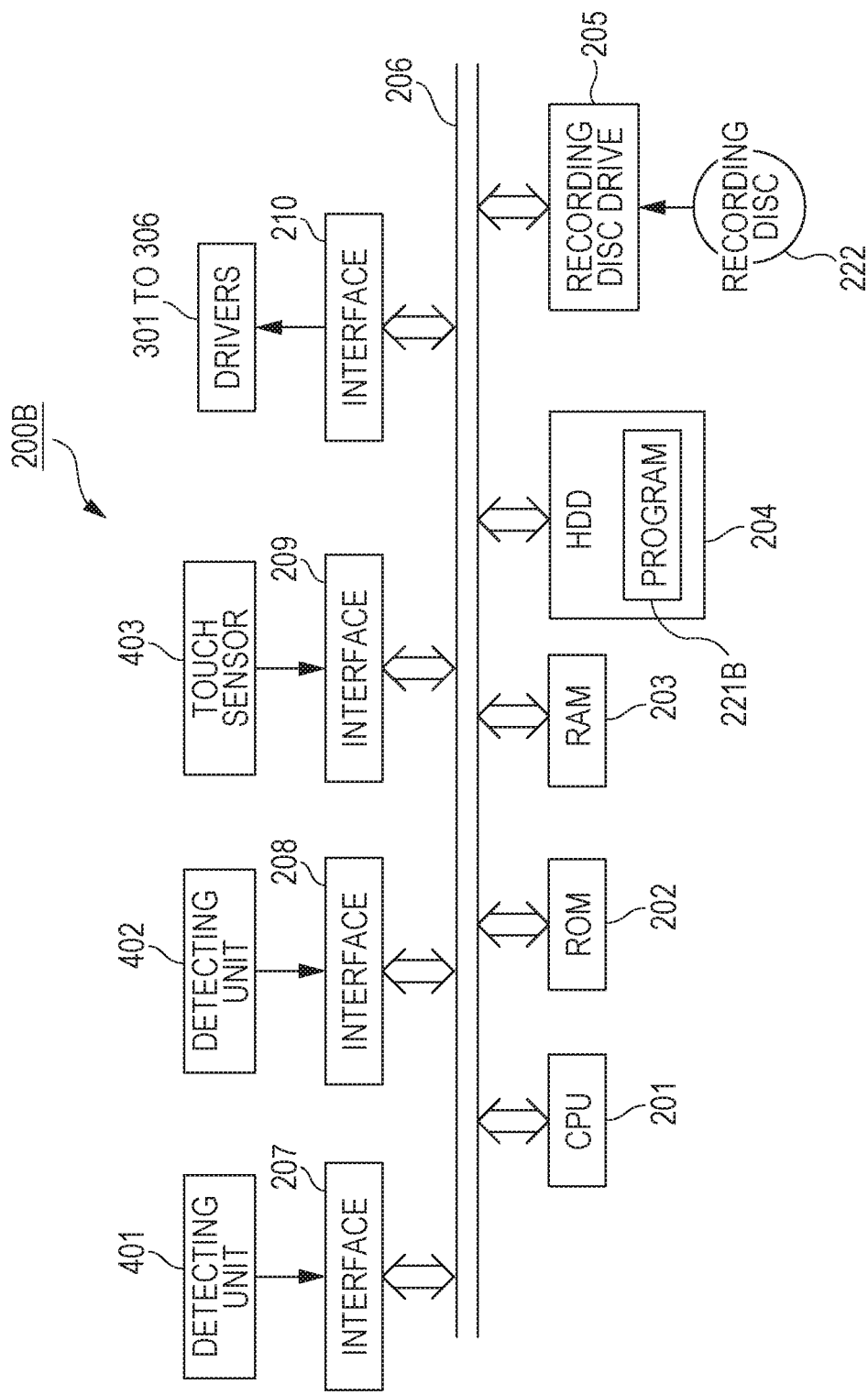
FIG. 15 is a block diagram illustrating a configuration of a control device according to the third embodiment.

FIG. 15 is a block diagram illustrating the configuration of the control device 200B. The control device 200B is configured as a computer, including a CPU 201 serving as a control unit (computing unit) ROM 202, RAM 203, an HDD 204, a recording disk drive 205, and various interfaces 207, through 210, in the same way as with the first embodiment described above.

The CPU 201 has connected thereto the ROM 202, RAM 203, HDD 204, recording disk drive 205, and various interfaces 207, through 210, via a bus 206. The CPU 201 executes various types of computation processing based on a program 221B recorded in the HDD 204.

The aforementioned drivers 301 through 306 are connected to the interface 210. The CPU 201 outputs the generated force command values $u_{e1}$, $u_{f1}$, $u_{e2}$, $u_{f2}$, $u_{e3}$, and $u_{f3}$ to the drivers 301 through 306 via the bus 206 and interface 210. Thus, the drivers 301 through 306 generate generated force at the actuators $e_1$, $f_1$, $e_2$, $f_2$, $e_3$, and $f_3$, corresponding to the generated force command values that have been input.

In the third embodiment, the robot device 100B includes a detecting unit 401 which is a first detecting unit, and a detecting unit 402 which is a second detecting unit, omitted from illustration in FIG. 13, and a touch sensor 403. The detecting unit 401 is disposed at the joint J1 in FIG. 9, and detects the joint angle $\theta_1$ of the joint J1 (first joint angle). The detecting sensor 402 is disposed at the joint J2 in FIG. 13, and detects the joint angle $\theta_2$ of the joint J2 (second joint angle). The touch sensor 403 is disposed on the link 101 or link 102, and detects whether or not an object has come into contact with the link 101 or link 102.

The detecting unit 401 is connected to the interface 207, so that a signal indicating the detected joint angle $\theta_1$ is transmitted to the CPU 201 via the interface 207 and bus 206. The detecting unit 402 is connected to the interface 208, so that a signal indicating the detected joint angle $\theta_2$ is transmitted to the CPU 201 via the interface 208 and bus 206. The touch sensor 403 is connected to the interface 209, so that a signal indicating whether or not there has been contact is transmitted to the CPU 201 via the interface 209 and bus 206.

Figure 16:
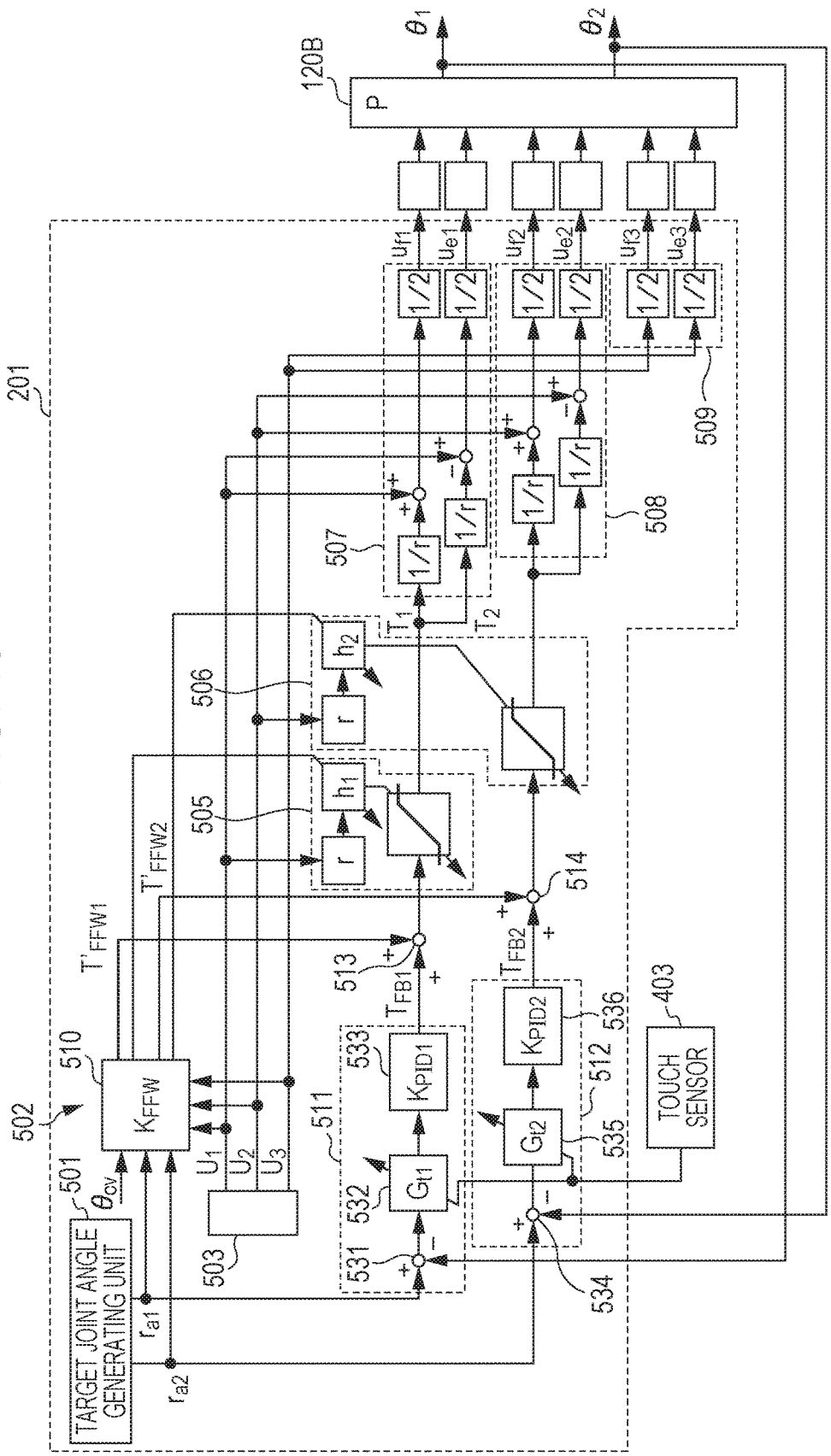
FIG. 16 is a functional block line diagram for describing control operations of a CPU according to the third embodiment.

FIG. 16 is a functional block line diagram for describing control operations of the CPU 201. A robot control method will be described with reference to FIG. 16. Note that in FIG. 12, the manipulator 120B is denoted by reference symbol P. The CPU (control unit) 201 of the control device 200B functions as each part illustrated in FIG. 16 by reading out the program 221B from the HDD 204 and executing the program 221B.

That is to say, the CPU 201 functions as a target joint angle generating unit 501, a joint torque computing unit 502, a summing unit 503, restricting units 505 and 506, and generated force computing units 507, 508, and 509, based on the program 221B.

The target joint angle generating unit 501 executes target joint angle generating processing to generate a target joint angle $r_{a1}$ for the joint J1 (first target joint angle) and a target joint angle $r_{a2}$ for the joint J2 (second target joint angle), based on the target trajectory or the tip E of the link 102.

The joint torque computing unit 502 executes first joint torque computing processing to compute the joint torque for the joint J1 (first joint torque) $T_1$ necessary to bring the joint angle $\theta_1$ to the target joint angle $r_{a1}$ (first joint torque calculating step). The joint torque computing unit 502 also executes second joint torque computing processing to compute the joint torque for the joint J2 (second joint torque) $T_2$ necessary to bring the joint angle $\theta_2$ to the target joint angle $r_{a2}$ (second joint torque calculating step).

The joint torque computing unit 502 executes first feed-forward computing processing and first feedback computing processing as first joint torque computing processing, and second feed-forward computing processing and second feedback computing processing as second joint torque computing processing.

The joint torque computing unit 502 has a feed-forward computing unit 510 which performs the first feed-forward computing processing and second feed-forward computing processing. This feed-forward computing unit 510 also executes later-described first setting processing and second setting processing. The joint torque computing unit 502 also has a feedback computing unit 511 which performs the first feedback computing processing and a feedback computing unit 512 which performs the second feedback computing processing. The joint torque computing unit 502 further has an adding unit 513 which executes first adding processing, and an adding unit 514 which executes second adding processing.

The summing unit 503 calculates the first target stiffness and second target stiffness of the joints J1 and J2 respectively, from the target stiffness of the end effector E. The summing unit 503 obtains, based on each target stiffness, a sum value $U_1$ indicating the sum of generated forces $u_{e1}$ and $u_{f1}$ (first sum value), a sum value $U_2$ indicating the sum of generated forces $u_{e2}$ and $u_{f2}$ (second sum value), and a sum value $U_3$ indicating the sum of generated forces $u_{e3}$ and $u_{f3}$ (third sum value). That is to say, the summing unit 503 obtains the sum value $U_1$ as first summing processing (first summing step, obtains the sum value $U_2$ as second summing processing (second summing step), and obtains the sum value $U_3$ as third summing processing (third summing step).

The feed-forward computing unit 510 performs feed-forward computation using the sum values $U_1$, $U_2$, and $U_3$, and target joint angles $r_{a1}$ and $r_{a2}$, to obtain the feed-forward control torque $T_{FFW}$ for the joints J1 and J2, as first and second feed-forward computing processing.

2.1 Feed-forward Control System

We will say that the difference of the generated force command values $T_n$, and the sum is $U_n$, in the same way as with the second embodiment described above, which yields the following.

$$(u_{fn} - u_{en})r = T'_{FFWn} + T_{FBn} = T_n, n=1,2,3 \quad (41)$$

$$u_{fn} + u_{en} = U_n, n=1,2,3 \quad (40)$$

$T'_{FFWn}$ and $T_{FBn}$ are torques obtained from the feed-forward system and feedback system, respectively. In this section, a method for deriving feed-forward control input with $T_{FBn}=0$ will be described.

Defining Expressions (38) and (39) as $$\theta_v = [\theta_1 \theta_2]^T, T_v = [T_1 + T_3 T_2 + T_3]^T$$

to make matrix notation yields the following.

$$M_m(\theta_v)\ddot{\theta}_v + C_m(\theta_v,\dot{\theta}_v)\dot{\theta}_v = -K_v(\theta_v - \theta_{cv}) - C_v\dot{\theta}_v + T_v \quad (42)$$

Note that $K_v$ and $C_v$ are a stiffness matrix and attenuation matrix, respectively, according to muscle viscoelasticity, as follows.

$$K_v = \begin{bmatrix} U_1 + U_3 & U_3 \\ U_3 & U_2 + U_3 \end{bmatrix} kr^2, \quad (43)$$

$$C_v = \begin{bmatrix} U_1 + U_3 & U_3 \\ U_3 & U_2 + U_3 \end{bmatrix} br^2$$

Further, $\theta_{cv}$ is a vector of neutral orientation angles $\theta_{c1}$ and $\theta_{c2}$ according to elasticity of a muscle when joint torques $T_1$ and $T_2$ are not acting, and is as follows.

$$\theta_{cv} = [\theta_{c1} \theta_{c2}]^T \quad (44)$$

The bi-articular simultaneous driving actuators $e_3$ and $f_3$ can provide torque to the joint in the same way as with a mono-articular driving actuator, by providing difference in the generated force command values $u_{e3}$ and $u_{f3}$. However, multiple feedback control systems controlling a single link is redundant, making for a complicated design of the feedback control system. Accordingly, in the third embodiment, the bi-articular simultaneous driving actuators $e_3$ and $f_3$ are used to provide stiffness to the joints J1 and J2, and the difference $T_3$ between the generated forces $u_{e3}$ and $u_{f3}$ is as follows.

$$T_3 = 0 \quad (45)$$

Thus, it can be seen that $T_1$ and $T_2$ provide the joints with torque, and that $U_1$, $U_2$, and $U_3$ increase or reduce stiffness and viscosity as to the joints.

We will say that the target trajectory as to the joint angle $\theta_n$ (n=1, 2) is $r_{an}$ (n=1, 2), and defined as follows.

$$r_{av} = [r_{a1} r_{a2}]^T \quad (46)$$

The feed-forward control torque $T_{FFW} = [T_{FFW1} \ T_{FFW2}]^T$, for the joint angle to track the target trajectory, is obtained by $$T_{FFW} = M_m(r_{av})\ddot{r}_{av} + C_m(r_{av},\dot{r}_{av})\dot{r}_{av} + K_v(r_{av} - \theta_{cv}) + C_v\dot{r}_{av} \quad (47)$$

by inverse kinetics where the angular velocity and angular acceleration are $\dot{r}_{av}, \ddot{r}_{av}$ respectively.

Next, the generated forces $u_{en}$ and $u_{fn}$ (n=1, 2) are derived in the same way as with the second embodiment described above, and in zones where the results are negative values, the terms in the Expression (41) for joint stiffness where generated force takes a negative value are replaced with 0. The feed-forward control torque is obtained from Expression (47) again for the zones where the results are negative values, and made to replace the earlier results, thereby obtaining feed-forward control torque $T'_{FFW}$.

That is to say, the feed-forward computing unit 510 computes the feed-forward control torque $T_{FFWn}$ by inverse kinetics, and determines whether or not $|T_{FFWn}| < U_n \times r$ is satisfied. In the event of determining that this is not satisfied, the feed-forward computing unit 510 sets 0 to the viscoelasticity constant for the actuator where the generated force is a negative value, and computes the feed-forward control torque $T'_{FFWn}$ by inverse kinetics again.

2.2 2-Degree-of-Freedom Control System

The feedback computing unit 511 obtains feedback control torque $T_{FB1}$ for the joint J1 by feedback computing, as first feedback computing processing. The feedback computing unit 512 obtains feedback control torque $T_{FB2}$ for the joint J1 by feedback computing, as second feedback computing processing.

The feedback computing unit 511 includes a difference computing unit 531, a gain adjusting unit 532, and a PID control unit 533. The feedback computing unit 512 includes a difference computing unit 534, a gain adjusting unit 535, and a PID control unit 536.

The difference computing unit 531 computes the difference between the joint angle $\theta_1$ and the target joint angle $r_{a1}$ ($\theta_1 - r_{a1}$). The gain adjusting unit 532 sets the gain to 0 in a case where contact is detected by the contact sensor 403, and sets the gain to 1 if not detected. The PID control unit 533 computes feedback control torque $T_{FB1}$ to compensate the difference ($\theta_1 - r_{a1}$), based on the transfer function $K_{PID1}$.

The difference computing unit 534 computes the difference between the joint angle $\theta_2$ and the target joint angle $r_{a2}$ ($\theta_2 - r_{a2}$). The gain adjusting unit 535 sets the gain to 0 in a case where contact is detected by the contact sensor 403, and sets the gain to 1 if not detected. The PID control unit 536 computes feedback control torque $T_{FB2}$ to compensate the difference ($\theta_2 - r_{a2}$), based on a transfer function $K_{PID2}$.

The adding unit 513 adds the feedback control torque $T_{FB1}$ to the feed-forward control torque $T'_{FFW1}$ so as to obtain the joint torque $T_1$, as first adding processing. The adding unit 514 adds the feedback control torque $T_{FB2}$ to the feed-forward control torque $T'_{FFW2}$ so as to obtain the joint torque $T_2$, as second adding processing.

In a case of non-antagonistic driving, the feed-forward computing unit 510 sets the first restricting coefficient $h_1$ to a value greater than 1, and in a case of antagonistic driving sets the first restricting coefficient $h_1$ to 1, as first setting processing (first setting step). In the same way, in a case of non-antagonistic driving, the feed-forward computing unit 510 sets a second restricting coefficient $h_2$ to a value greater than 1, and in a case of antagonistic driving sets the second restricting coefficient $h_2$ to 1, as second setting processing (second setting step).

The restricting unit 505 has as the first restricting condition $|T_1| < U_1 \times r \times h_1$, and restricts the joint torque $T_1$ to a range so as to satisfy the first restricting condition (first restricting step). The restricting unit 506 has as the second restricting condition $|T_2| < U_2 \times r \times h_2$, and restricts the joint torque $T_2$ to a range so as to satisfy the second restricting condition (second restricting step).

That is to say, the control input $T_n$ (n=1, 2) is restricted as follows, in the same way as with the second embodiment.

$$|T_n| < U_n r u_n, n=1,2 \qquad (48)$$

Note that $h_n$ (n=1, 2) is a parameter representing the degree of antagonism as to the n'th link, and is automatically generated by setting h>>1 in a zone where the conditions of antagonistic driving are not satisfied, in the same way as with the second embodiment described above. The generated forces $u_{fn}$, $u_{en}$ (n=1, 2) are as follows.

$$u_{fn} = \frac{U_n + T_n/r}{2}, u_{en} = \frac{U_n - T_n/r}{2} \qquad (49)$$

Also, $T_3 = 0$ has been set, meaning that the difference of the generated forces $u_{f3}$, $u_{e3}$ as to the actuators $e_3$ and $f_3$ is set to 0, the generated forces $u_{f3}$, $u_{e3}$ are as follows.

$$u_{f3} = u_{e3} = \frac{U_3}{2} \qquad (50)$$

That is to say, the generated force computing unit 507 computes the generated force of the actuators $e_1$ and $f_1$ based on the joint torque $T_1$ restricted by the restricting unit 505, as first generated force computing processing (first generated force computing step). The generated force computing unit 508 computes the generated force of the actuators $e_2$ and $f_2$ based on the joint torque $T_2$ restricted by the restricting unit 506, as second generated force computing processing (second generated force computing step). The generated force computing unit 509 computes the generated force of the actuators $e_3$ and $f_3$ based on Expression (50), since torque $T_3 = 0$, as third generated force computing processing (third generated force computing step).

2.3 End Effector Stiffness Control

The one-link manipulator 120 according to the first embodiment above was described as the stiffness of the joint J1 and the stiffness of the end effector being the same. The stiffness of the end effector E of the "three-pair six-muscle model" two-link manipulator 120B is obtained by controlling the generated force sums $U_1$, $U_2$, and $U_3$. It is known that by controlling the generated force sums $U_1$, $U_2$, and $U_3$ so that $$U_1 = U_2 = U_3 \qquad (51)$$

the long axis of the stiffness ellipse is aligned in a direction connecting the joint J1 and the end effector E.

In Japanese Patent Laid-Open No. 2012-86354, the sum of generated force $U_1$, $U_2$, $U_3$, where the long and short axes of the stiffness ellipse of the end effector E are parallel to the x and y axes.

2.4 Trajectory Design

In the third embodiment, the end effector E drives the target trajectory in parallel to the y axis. Further, the third embodiment uses a trajectory having an acceleration zone, a constant velocity zone, and a deceleration zone, in the same way as with the first embodiment. The target trajectories $r_{a1}$ and $r_{a2}$ as to the joint angles are obtained by the target joint angle generating unit 501 from the end effector trajectory by inverse kinematics.

Next, the target stiffness is set so as to satisfy Expression (51), with the long axis of the stiffness ellipse aligned in a direction connecting the joint J1 and the end effector E at the target position of the end effector E. Also, settings are made such that stiffness is high in the acceleration zone and stiffness is low in the constant velocity zone. We will say that the sum of generated force of the mono-articular actuator in the acceleration and deceleration zones is $U_{nmax}$, $U_{nmax}$ (n=1, 2, 3), and the sum of generated force of the mono-articular actuator in the constant velocity zone is $U_{nmin}$, $U_{nmin}$ (n=1, 2, 3).

In the third embodiment, trajectory having an acceleration zone, a constant velocity zone, and a deceleration zone has been described, but a trajectory not having a constant velocity zone, such as a minimum jerk trajectory for example, may be used. Further, the target stiffness may be constant in a case where efficiency of driving is not taken into consideration.

3. Simulation

Simulation was performed using the control system described above. The physical parameters of the link 101 and link 102 are the same. The length of the links 101 and 102 was 0.2 m, the inertia moment of the links 101 and 102 was set to $I_1=I_2=1.3\times10^{-3}$ kgm$^2$, the moment arm radius to 0.05 m, and the elastic constant and viscosity constant to k=12 and b=0.003, respectively. The target trajectory was set such that constant velocity zone starting time $t_a=0.2747$ seconds, constant velocity zone ending time $t_b=0.4746$ seconds, and positioning ending time $t_{fin}=0.75$ seconds. Also, neutral orientation angles $\theta_{c1}$ and $\theta_{c2}$ according to elasticity when joint torques $T_1$ and $T_2$ are not acting were set to joint angles at an intermediate point on the end effector trajectory, such that $\theta_{c1}=29.7$ degrees and $\theta_{c2}=120.7$ degrees.

Figure 17:
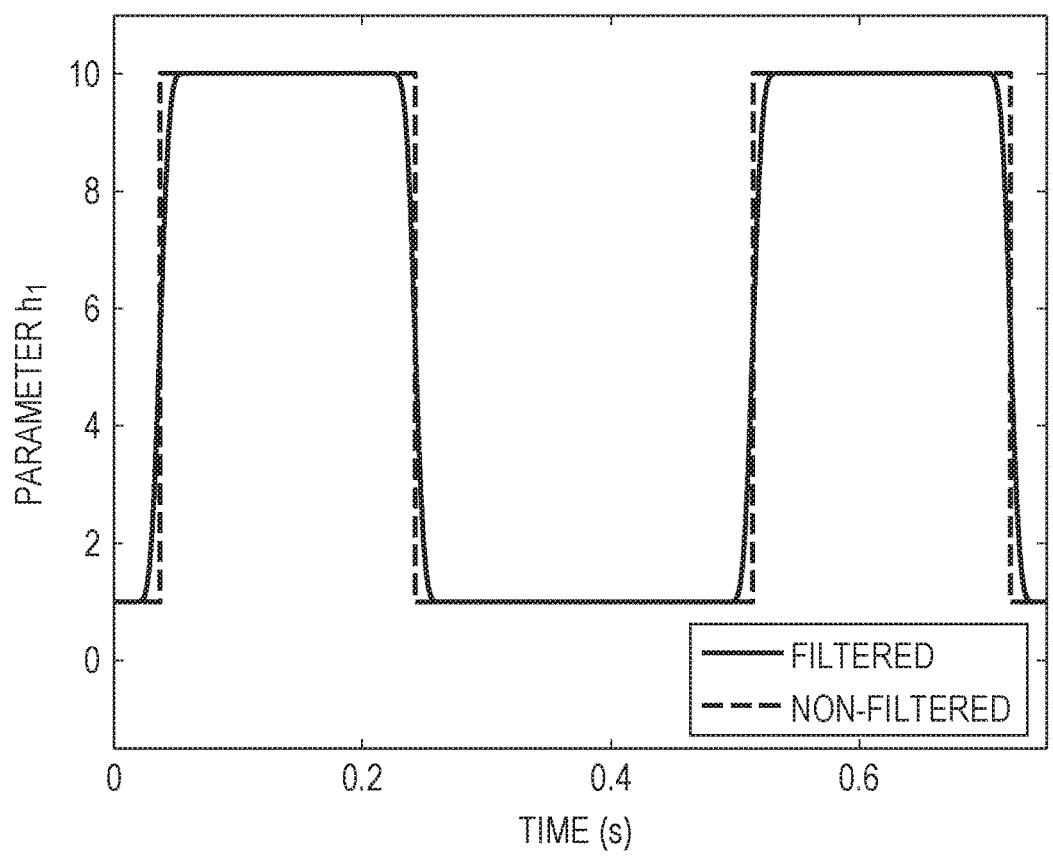
FIG. 17 is a diagram illustrating simulation results according to the third embodiment.

FIG. 17 illustrates the parameter $h_1$ for adjusting the degree of antagonism for the link 101 at this time. In the same way as with the second embodiment described above, the parameter $h_1$ generated at $h_1=10$ during non-antagonistic driving is indicated by a broken line, and the parameter $h_1$ using the zero phase low-pass filter is indicated by a solid line. On the other hand, $h_2=1$ is set for all zones where the conditions for antagonistic driving are constantly satisfied for the link 102. The sums $U_1$, $U_2$, and $U_3$, of generated force of the actuators, are controlled so that the stiffness ellipse of the end effector E is aligned in a direction connecting the joint J1 and the end effector E.

In the third embodiment, the inertia moments are set to $I_1$ and $I_2$ for generating feedback control torque, in order to verify identified error of the 2-degree-of-freedom system model, in the same way as with the second embodiment described above. In the simulation, the inertia moments of the links 101 and 102 were set to $I_1'=1.1\times I_1$, $I_2'=1.1\times I_2$.

Figure 18A:
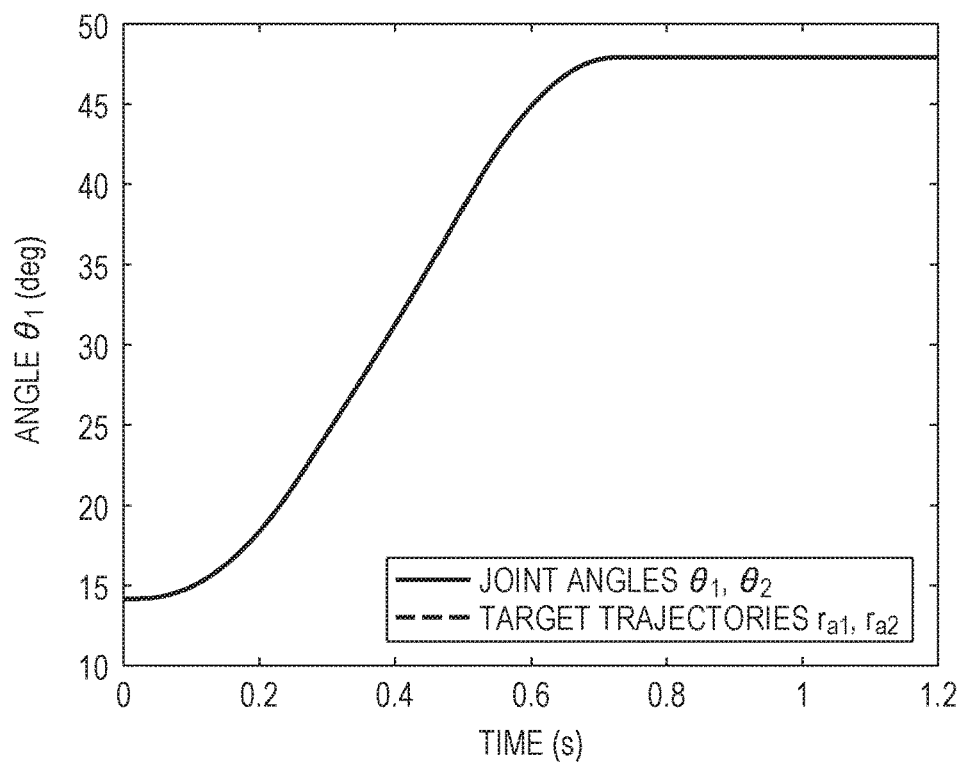
FIGS. 18A and 18B are diagrams illustrating simulation results according to the third embodiment.
Figure 18B:
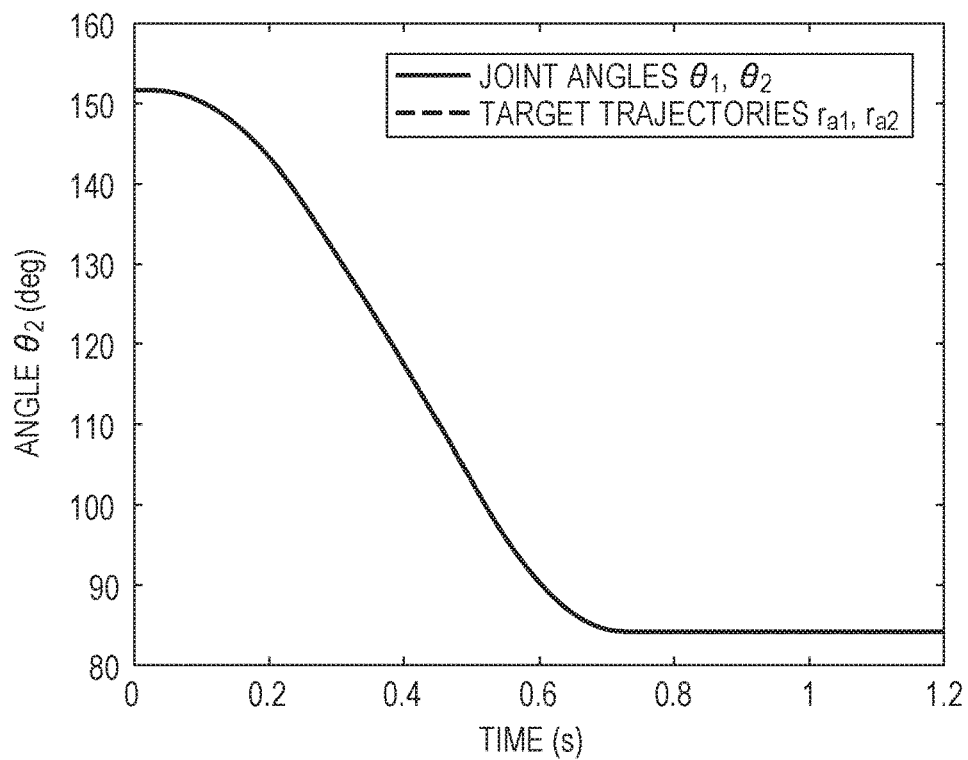
Figure 19A:
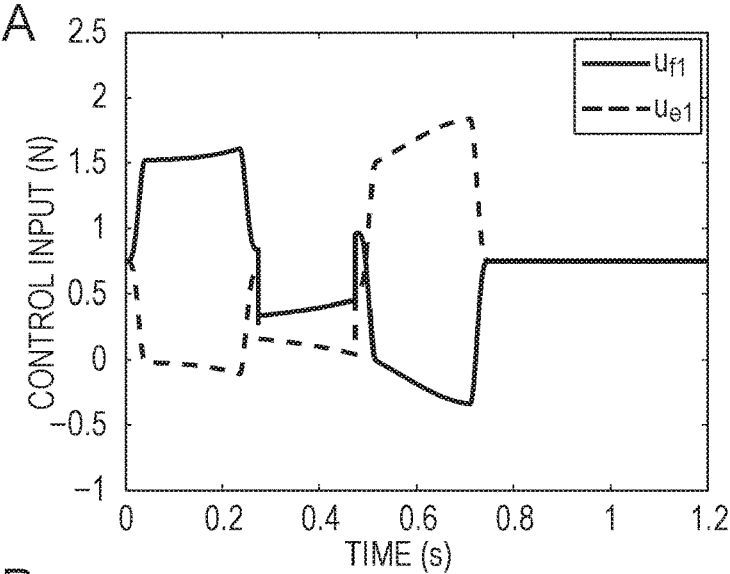
FIGS. 19A through 19C are diagrams illustrating simulation results according to the third embodiment.
Figure 19B:
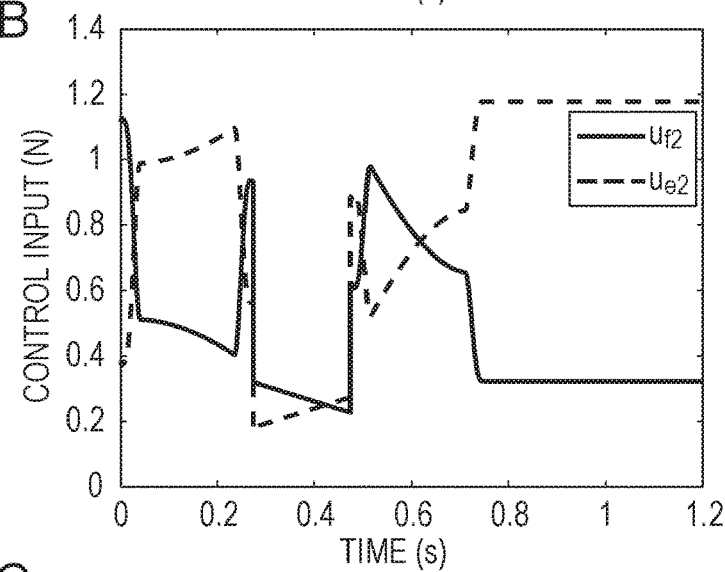
Figure 19C:
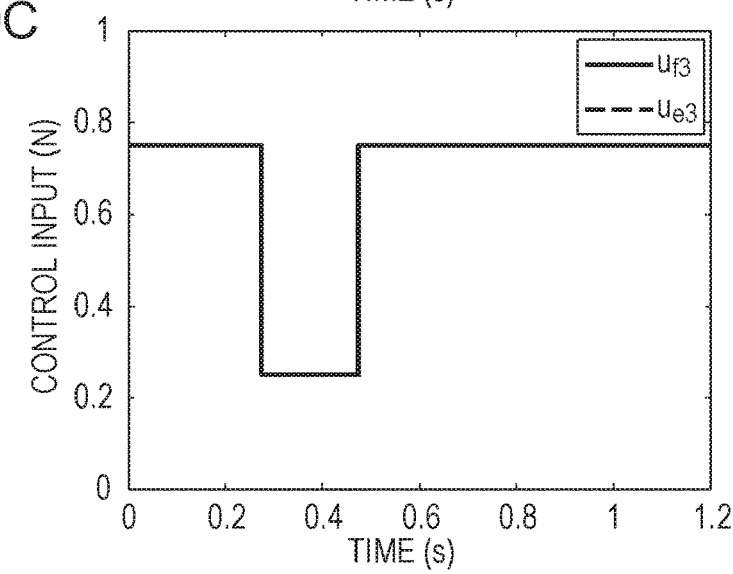
Figure 20A:
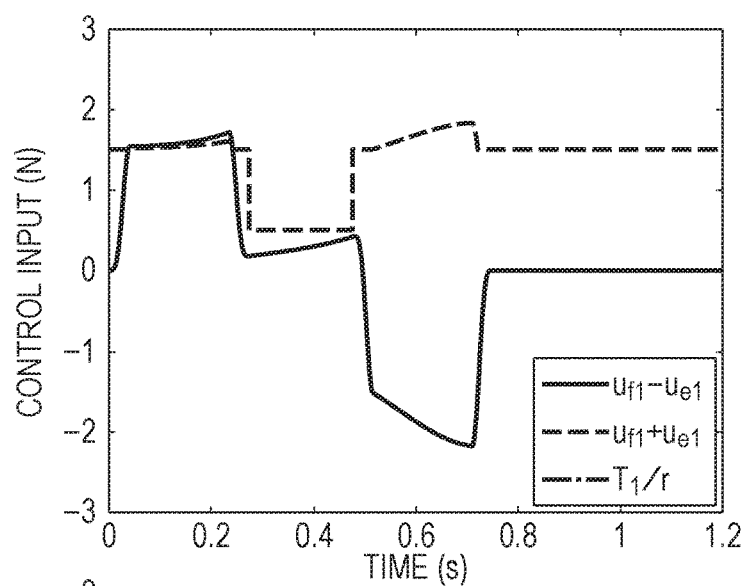
FIGS. 20A through 20C illustrating simulation results according to the third embodiment.
Figure 20B:
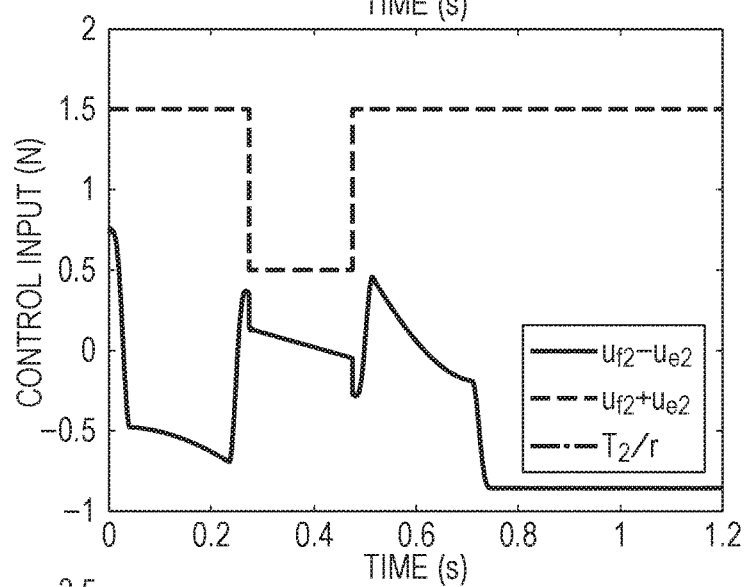
Figure 20C:
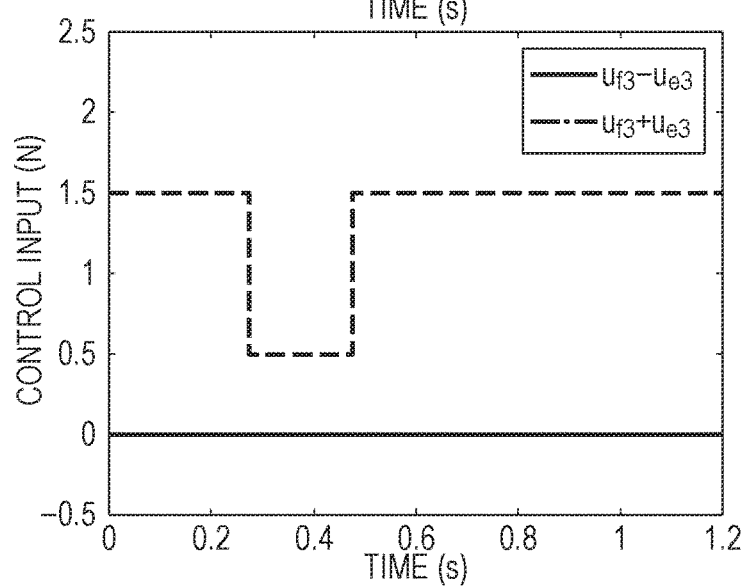
Figure 21A:
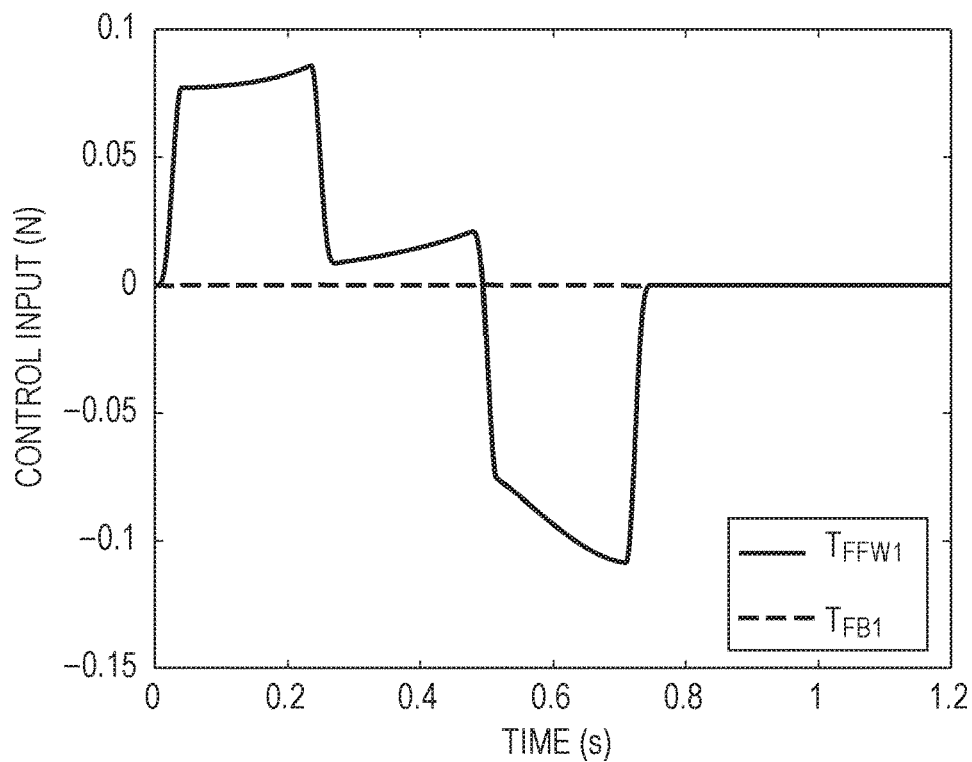
FIGS. 21A and 21B are diagrams illustrating simulation results according to the third embodiment.
Figure 21B:
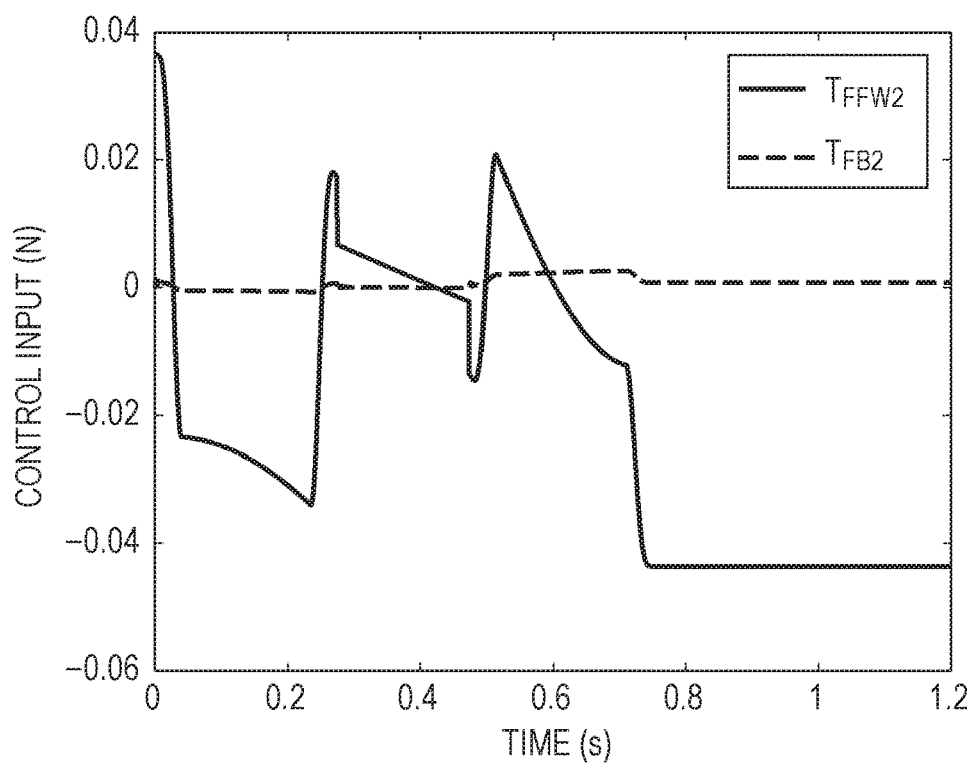

FIGS. 18A and 18B illustrate the joint angles $\theta_1$ and $\theta_2$ of the links 101 and 102 by solid lines, and target trajectories $r_{a1}$ and $r_{a2}$ by broken lines, respectively. FIGS. 19A through 19C illustrate the response of generated force command values $u_{f1}$, $U_{f2}$, and $u_{f3}$, by solid lines, and the response of generated force command values $u_{e1}$, $U_{e2}$, and $u_{e3}$, by broken lines. Further, FIGS. 20A through 20C illustrate the difference of the generated force command values $u_{en}$ and $u_{fn}$ (n=1, 2, 3) by a solid line, the sum by a broken line, and the response of $T_n/r$ (n=1, 2) by a single-dot broken line. FIG. 21A illustrates $T_{FFW1}$ and $T_{FB1}$, and FIG. 21B illustrates $T_{FFW2}$ and $T_{FB2}$, by solid lines and broken lines, respectively.

It can be seen from FIGS. 18A and 18B that the joint angles $\theta_1$ and $\theta_2$ illustrated by solid lines overlap the trajectories illustrated by broken lines, meaning that the links 101 and 102 are following the target trajectory. This is because the feedback control torque compensates for the model error as indicated by the broken lines in FIGS. 21A and 21B. According to the response of the link 101 illustrated in FIG. 19A, the generated forces $u_{e1}$ and $u_{f1}$ are the control input $T_1$ of the 2-degree-of-freedom control system distributed according to the conditions given in Expressions (48) and (49). According to FIG. 17, setting h>>1 in the acceleration zone so as to perform non-antagonistic driving causes the folding side to generate contractile force and the unfolding side to generate pushing force in the acceleration zone, and the folding side to generate pushing force and the unfolding side to generate contractile force in the deceleration zone. In zones where h=1, antagonistic driving is performed where both unfolding side and folding side artificial muscles generate positive force. Also, according to FIG. 19B, the link 102 is constantly set to $h_2=1$, so it can be seen that the generated forces $u_{e2}$ and $u_{f2}$ are constantly generating contractile force. According to FIG. 19C, the generated forces $u_{e3}$ and $u_{f3}$ are such that $U_3/2$ holds.

In FIG. 20A, $u_{f1}-u_{e1}$ indicated by the solid line overlays the $T_1/r$ indicated by the single-dot dashed line, satisfying the conditions of Expression (40). Also, $u_{f1}+u_{e1}=U_1$ indicated by the broken line does not satisfy the target value of stiffness due to non-antagonistic driving in the acceleration zone, but is $U_{1max}$ during antagonistic driving in a stable state. In the same way, in FIG. 20B, $u_{f2}-u_{e2}$ indicated by the solid line overlays the $T_2/r$ indicated by the single-dot dashed line, satisfying the conditions of Expression (40). Also, $u_{f2}+u_{e2}=U_2$ indicated by the broken line satisfies the target value of stiffness due to constant antagonistic driving. Further, in FIG. 20C, $u_{f3}-u_{e3}$ indicated by the solid line is 0, thus satisfying the conditions of Expression (45). It can also be seen that $u_{f3}+u_{e3}=U_3$ indicated by the broken line matches the target value.

Thus, it can be seen that the stiffness ellipse of the end effector E is controlled in a direction connecting the joint J1 and the end effector E, since the stiffness of each antagonistic pair is controlled to the positioning target angle. According to the 2-degree-of-freedom control system according to the third embodiment, seamless transition is made between antagonistic driving and non-antagonistic driving, and it can be seen that stiffness of the end effector E can be controlled by elasticity of the "three-pair six-muscle model" while realizing tracking of the target trajectory.

Note that the present invention is not restricted to the above-described embodiments, and that various modifications may be made by one with ordinary skill in the art without departing from the technical idea of the present invention.

The processing operations of the above embodiments are specifically executed by the CPU 201 serving as the control unit of the control devices 200, 200A, and 200B. Accordingly, a recording medium in which is recorded a program for realizing the above-described functions may be supplied to a control device, and the computer (CPU or MPU) of a the control device reading out and executing the program stored in the recording medium, so as to achieve the same results. In this case, the program itself read out from the recording medium realizes the functions of the embodiments described above, and the program itself and the recording medium recording the program make up the present invention.

Also, a case has been described in the above embodiments where the computer-readable recording medium is the HDD 204 and the programs 221, 221A, and 221B are stored in the HDD 204, but the present invention is not restricted to this arrangement. The programs may be recorded in any recording medium as long as a computer-readable recording medium. Examples of recording mediums for supplying the program include the ROM 202 and recording disc 222 illustrated in FIGS. 3 and 15, an external storage device not illustrated, and so forth. Specific examples which may be used as a recording medium include a flexible disk, hard disk, optical disc, magneto-optical disc, CD-ROM, CD-R, magnetic tape, rewritable non-volatile memory (e.g., USB memory), ROM, or the like.

Also, a the programs according to the above-described embodiments may be downloaded over a network and executed by a computer.

The present invention is not restricted to a computer executing program code which has been read out so as to realize the functions of the above-described embodiments. Also encompassed is a case where an operating system (OS) or the like running on the computer performs part or all of the actual processing based on instructions of the program code, and the functions of the embodiments described above are realized by that processing.

Further, program code read out from a recording medium may be written to a function extension board inserted into the computer or memory in a function extension unit connected to the computer. Also encompassed is a case where a CPU or the like provided to the function extension board or function extension unit performs part or all of the actual processing based on instructions of the program code, and the functions of the embodiments described above are realized by that processing.

The above embodiments have been described with regard to a case where the computer executes by programs recorded in the recording medium such as a HDD or the like, thereby carrying out the functions illustrated in FIGS. 4, 8, and 16, but the present invention is not restricted to this arrangement. Part or all of the functions of the control unit illustrated in FIGS. 4, 8, and 16 may be configured as a large-scale integration (LSI) such as an application specific integrated circuit (ASIC) or field-programmable gate array (FPGA).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A robot device comprising:
a manipulator having:
   a first link linked to a base by a first bendable portion; and
   a pair of first actuators, each of the first actuators situated on respective sides of the first link so as to cause the first bendable portion to bend, and each of the pair of first actuators including a parallel type variable stiffness actuator; and
a control unit configured to drive the pair of first actuators to thereby bend the first bendable portion to a target angle,
wherein the control unit is further configured to, in a case the target angle is updated, drive the pair of first actuators in a non-antagonistic driving mode, and thereafter switch to drive the pair of first actuators in an antagonistic drive mode, the antagonistic driving mode being a driving mode in which both of the first actuators generate tensile forces, and the non-antagonistic driving mode being a driving mode in which one of the first actuators generates a tensile force and the other one of the first actuators generates a pushing force, and
wherein the control unit gradually switches from the non-antagonistic driving mode to the antagonistic driving mode.

2. The robot device according to claim 1, wherein the first bendable portion includes a rotatable link.

3. The robot device according to claim 1, wherein the manipulator has:
a second link linked to the first link by a second bendable portion; and
a pair of second actuators, each of the second actuators situated on respective sides of the second link so as to cause the second bendable portion to bend, wherein the control unit is configured to drive the pair of second actuators in an antagonistic driving mode in which both of the second actuators generate tensile forces and in a non-antagonistic driving mode in which one of the second actuators generates a tensile force and the other one of the second actuators generates a pushing force.

4. The robot device according to claim 3, wherein the second bendable portion includes a rotatable link.

5. The robot device according to claim 3, wherein each of the pair of second actuators includes a parallel type variable stiffness actuator.

6. The robot device according to claim 3, wherein the control unit is further configured to drive the pair of second actuators to gradually switch from one of the antagonistic driving and the non-antagonistic driving mode to the other.

7. The robot device according to claim 3, wherein the control unit drives the pair of second actuators in the non-antagonistic driving mode to give acceleration to the second link, and thereafter switches to drive the pair of second actuators in the antagonistic driving mode.

8. A robot control method of a robot device including
a manipulator including
   a first link linked to a base by a first bendable portion; and
   a pair of first actuators, each of the first actuators situated on respective sides of the first link so as to cause the first bendable portion to bend; each of the pair of first actuators including a parallel type variable stiffness actuator,
the method comprising:
driving the pair of first actuators to thereby bend the first bendable portion to a target angle
wherein in a case the target angle is updated, the driving is performed such that the pair of first actuators is driven in a non-antagonistic driving mode, and thereafter switch to drive the pair of first actuators in an antagonistic driving mode, the non-antagonistic driving mode being a driving mode in which both of the first actuators generate tensile forces and the non-antagonistic driving mode being a driving mode in which one of the first actuators generates a tensile force and the other one of the first actuators generates a pushing force, and
wherein the switching from the non-antagonistic driving mode to the antagonistic driving mode is performed gradually.

9. The robot control method according to claim 8, wherein the manipulator has a second link linked to the first link by a second bendable portion, and a pair of second actuators, each of the second actuators situated on respective sides of the second link so as to cause the second bendable portion to bend,
wherein the control method further comprises driving the pair of second actuators in an antagonistic driving mode in which both of the second actuators generate tensile forces and in a non-antagonistic driving mode in which one of the second actuators generates a tensile force and the other one of the second actuators generates a pushing force.

10. The robot control method according to claim 9, further comprising driving the pair of second actuators to gradually switch from one of the antagonistic driving and the non-antagonistic driving mode to the other.

11. A robot device comprising:
a manipulator having:
- a first link linked to a base by a first bendable portion; and
- a pair of first actuators, each of the first actuators situated on respective sides of the first link so as to cause the first bendable portion to bend, and each of the pair of first actuators including a parallel type variable stiffness actuator; and a control unit configured to drive the pair of first actuators to thereby bend the first bendable portion to a target angle, wherein the control unit is further configured to, in a case the target angle is updated, drive the pair of first actuators in an antagonistic driving mode, and thereafter switch to drive the pair of first actuators in a non-antagonistic drive mode, the antagonistic driving mode being a driving mode in which both of the first actuators generate tensile forces, and the non-antagonistic driving mode being a driving mode in which one of the first actuators generates a tensile force and the other one of the first actuators generates a pushing force, and wherein the control unit gradually switches from the antagonistic driving mode to the non-antagonistic driving mode.

12. The robot device according to claim 11, wherein the first bendable portion includes a rotatable link.

13. The robot device according to claim 11, wherein the manipulator has:
- a second link linked to the first link by a second bendable portion; and
- a pair of second actuators, each of the second actuators situated on respective sides of the second link so as to cause the second bendable portion to bend, wherein the control unit is configured to drive the pair of second actuators in an antagonistic driving mode in which both of the second actuators generate tensile forces and in a non-antagonistic driving mode in which one of the second actuators generates a tensile force and the other one of the second actuators generates a pushing force.

14. The robot device according to claim 13, wherein the second bendable portion includes a rotatable link.

15. The robot device according to claim 13, wherein each of the pair of second actuators includes a parallel type variable stiffness actuator.

16. The robot device according to claim 13, wherein the control unit is further configured to drive the pair of second actuators to gradually switch from one of the antagonistic driving and the non-antagonistic driving mode to the other.

17. The robot device according to claim 13, wherein the control unit drives the pair of second actuators in the non-antagonistic driving mode to give acceleration to the second link, and thereafter switches to drive the pair of second actuators in the antagonistic driving mode.

18. The robot device according to claim 11, wherein the control unit drives the pair of first actuators in the antagonistic driving mode after the driving in the non-antagonistic driving mode.

19. A robot control method of a robot device including a manipulator including
- a first link linked to a base by a first bendable portion; and
- a pair of first actuators, each of the first actuators situated on respective sides of the first link so as to cause the first bendable portion to bend; each of the pair of first actuators including a parallel type variable stiffness actuator, the method comprising:
driving the pair of first actuators to thereby bend the first bendable portion to a target angle, wherein in a case the target angle is updated, the driving is performed such that the pair of first actuators is driven in a antagonistic driving mode, and thereafter switch to drive the pair of first actuators in a non-antagonistic driving mode, the antagonistic driving mode being a driving mode in which both of the first actuators generate tensile forces, and the non-antagonistic driving mode being a driving mode in which one of the first actuators generates a tensile force and the other one of the first actuators generates a pushing force, and wherein the switching from the antagonistic driving mode to the non-antagonistic driving mode is performed gradually.

20. The robot control method according to claim 19, wherein the manipulator has a second link linked to the first link by a second bendable portion, and a pair of second actuators, each of the second actuators situated on respective sides of the second link so as to cause the second bendable portion to bend, wherein the control method further comprises driving the pair of second actuators in an antagonistic driving mode in which both of the second actuators generate tensile forces and in a non-antagonistic driving mode in which one of the second actuators generates a tensile force and the other one of the second actuators generates a pushing force.

21. The robot control method according to claim 20, further comprising driving the pair of second actuators to gradually switch from one of the antagonistic driving and the non-antagonistic driving mode to the other.

* * * * *